(12) United States Patent
Okazaki

(10) Patent No.: US 6,755,764 B2
(45) Date of Patent: Jun. 29, 2004

(54) DIFFERENTIAL GEARS

(75) Inventor: Masaharu Okazaki, Okayama (JP)

(73) Assignee: OS Giken Co., Ltd., Okayama (JP)

( * ) Notice: Subject to any disclaimer, the term of this patent is extended or adjusted under 35 U.S.C. 154(b) by 0 days.

(21) Appl. No.: 10/094,648

(22) Filed: Mar. 12, 2002

(65) Prior Publication Data

US 2002/0132694 A1 Sep. 19, 2002

(30) Foreign Application Priority Data

Mar. 14, 2001 (JP) ......................................... 2001-072019
Mar. 19, 2001 (JP) ......................................... 2001-077713

(51) Int. Cl.[7] ............................................. F16H 48/22
(52) U.S. Cl. ......................... 475/235; 475/240; 475/231
(58) Field of Search ................................ 475/231, 234, 475/235, 240, 241

(56) References Cited

U.S. PATENT DOCUMENTS

| | | | | |
|---|---|---|---|---|
| 3,233,477 A | * | 2/1966 | O'Brien | 475/234 |
| 4,305,313 A | * | 12/1981 | Konkle | 475/240 |
| 5,133,696 A | * | 7/1992 | Kobayashi | 475/231 |
| 5,520,589 A | * | 5/1996 | Dewald et al. | 475/231 |
| 6,063,000 A | * | 5/2000 | Sugimoto | 475/231 |
| 6,168,545 B1 | * | 1/2001 | Lowell | 475/231 |

* cited by examiner

Primary Examiner—Charles A. Marmor
Assistant Examiner—Dennis Abdelnour
(74) Attorney, Agent, or Firm—Armstrong, Kratz, Quintos, Hanson & Brooks, LLP

(57) ABSTRACT

Differential gears which obtain adequate differential motion limiting action under heavy loading, and switch between a differential motion condition and a differential motion limiting condition, inside a differential case are provided a pair of left and right pressure rings, which move freely in the direction of the wheel axles but are incapable of relative turning, the inner diameter being larger than that of side gears; a pair of clutch means on the two pressure rings; urging means for urging the two pressure rings such that the two pressure rings clearance narrows; and actuation means for actuating the pressure rings against the force of the urging means, in accordance with the increases in the relative turning torque between the pinion shaft and the differential case during differential motion, and activating the clutch means.

4 Claims, 16 Drawing Sheets

DIFFERENTIAL GEARS

BACKGROUND OF THE INVENTION

1. Field of the Invention

This invention relates to differential gears having a differential motion limiting function.

2. Description of the Related Art

Among automobile differential gears, those (called limited slip differentials) having a differential motion limiting function, and fashioned so that, when the wheel on one side only tries to freewheel, adequate turning force is still transmitted to the wheel on the other side through clutch means, are widely employed in order to prevent the loss of adequate turning force to the wheel on one side when the wheel on the other side freewheels because it is on ice, snow, or mud or the like, and to prevent the auto-body fishtailing phenomenon when executing a turn or quick getaway or the like.

The differential gears 100 diagrammed in FIG. 14, for example, are described in Japanese Patent Publication No. S55-27980/1980 (published) and in Japanese Patent Application Laid-Open No. S58-221046/1983 (published). These differential gears 100 comprise a pair of pressure rings 103 deployed inside a differential case 101 so as to freely move in the direction of wheel axles 102 but be incapable of relative turning, a pinion shaft 104 deployed perpendicularly to the wheel axles 102 in a condition wherein the shaft end is held between the pressure rings 103, a pinion gear 105 deployed so as to freely turn on the pinion shaft 104, a pair of side gears 106 deployed to the left and right wheel axles 102, respectively, so as to be incapable of relative turning, which side gears 106 sandwich the pinion gear 105 and mesh with the pinion gear 105 on either side thereof, actuation means 108 that, in response to increases in relative turning torque between the pinion shaft 104 and the differential case 101 during differential motion, activate the pressure rings 103 in a direction such that the clearance 107 between the pressure rings 103 becomes greater, and clutch means 109 deployed on both sides of the pair of pressure rings 103 in the wheel axle direction, which clutch means 109 limit the differential motion of the left and right wheel axles 102 as the clearance 107 actuated by the pressure rings 103 becomes larger.

For the actuation means 108, various shapes are proposed. In one example thereof which is adopted, a cam unit 110 having a square shape one diagonal whereof is set in the wheel axle direction is formed on one shaft end of the pinion shaft 104, and a substantially V-shaped cam channel 111 into which the cam unit 110 engages is formed in the pressure rings 103.

In the differential gears 100, moreover, when relative turning torque occurs between the pinion shaft 104 and the differential case 101, the clearance 107 between the pressure rings 103 will widen due to the actuation means 108, and, thereby, the clutch means 109 will be activated and the differential motion of the left and right wheels will be limited, but the configuration is made so that, in order that the clearance 107 between the two pressure rings 103 will return to a set interval at normal times, elastic members 112 such as plate springs are positioned outside of the two sets of clutch means 109 in the wheel axle direction, so that the pressure rings 103 are urged in a direction such that they approach each other through a plurality of clutch plates 113 of the clutch means 109.

Now, in differential gears 100 such as this, it is necessary to secure sufficient area in the friction pressing portion of the clutch plates 113 in order that the differential motion of the left and right wheels will be definitely limited by the clutch means 109 in a differential motion limiting condition. However, the size of the differential case 101 is restricted by the positional relationship between the differential gears 100 and various equipment on the automobile side, making it very difficult to establish that size larger than what it is currently. For that reason, it has been virtually impossible to obtain a more adequate differential motion limiting action than what is obtained currently by increasing the number of clutch plates 113 or making their size larger.

In a horizontal engine vehicle, in particular, as compared to an inline engine vehicle, more severe restrictions are imposed by the layout of the engine and the parts peripheral thereto, and the shape and capacity of the differential case are sharply restricted. As in the differential gears 120 diagrammed in FIG. 15, for example, it is necessary to diminish the diameter of the left portion of the differential case 121, making it very difficult to establish satisfactorily large area in the friction pressing portion of the clutch means 122. In addition, when the urging force of the elastic members 123 is increased in order to increase the friction pressing force, it becomes impossible to obtain a differential motion condition while effecting a slow turn, as described earlier, wherefore it has been impossible to obtain adequate differential motion limiting action.

The applicant, as a result of assiduous investigations into how to adequately secure friction pressure force in clutch plates, discovered that, whereas configuring the clutch means deployed on either side of the two pressure rings in the wheel axle direction in left-right symmetry was established as one design condition in conventional differential gears, the same kind of differential motion limiting action could be obtained even with one member of the clutch means omitted. Thereupon, the applicant proposed differential gears such as the differential gears 120A diagrammed in FIG. 16, wherein clutch means 122A are only deployed between the left portion of a differential case 121A having room to spare and the wheel axle 102 on the left side.

However, even in these differential gears 120A, a problem developed in that, depending on the shape of the differential case 121A, with a differential case 121B wherein the right portion is given a large diameter, as indicated by the imaginary lines in FIG. 16, for example, a comparatively large portion of wasted material is formed in the right portion of the differential case 121B. Besides that, moreover, in the differential gears 100, 120, and 120A described in the foregoing, a side wall 103a is formed which extends to the vicinity of the sleeves of the side gears 106 in the pressure rings 103 in order to catch substantially the entire side surface of the clutch plates 113, but the applicant discovered that the number of clutch plates 113 becomes fewer precisely by the measure of the thickness t of the side wall 103a, and that there still exists ample leeway for enhancing the friction pressure force of the clutch plates 113.

In differential gears such as described above, moreover, it is desirable that, fundamentally, a differential motion condition ensue wherewith maneuvering in tight places can be done when making low-speed turns such as when garaging a vehicle or parallel parking, and that, when one wheel is freewheeling, or a quick getaway is being made, or when turning at high speed or under heavy loading, a differential motion limiting condition ensue wherewith stable initial performance is obtained.

With conventional differential gears, however, as seen in the differential gears 100, for example, given the relationship whereby the left and right pressure rings 103 are urged by elastic members 112 in a direction such that they will approach each other, via the clutch plates 113, when the urging force is set to be weak, manipulating the clutch means 109 by the actuation means 108 becomes easy, whereupon there are cases where a differential motion limiting condition will ensue even when making a low-speed turn, and the differential motion condition will not stabilize, whereas, when the urging force is made strong, the actuation means 108 reach a condition where differential motion is possible, but, due to the urging force of the elastic members 112, the clutch plates 113 are normally friction pressed, and attain a substantially differential motion limiting condition, as a consequence whereof a differential motion condition cannot after all be stably secured during low-speed turning. In other words, problems arise in that either the ability to maneuver in tight places during low-speed turning suffers, or the so-called chattering phenomenon occurs wherewith the differential motion limiting condition and differential motion condition switch back and forth, controllability deteriorates, and the differential gears 100 and equipment peripheral thereto are adversely affected by shocks during chattering.

For this reason, setting the urging force is very difficult. In a competition vehicle wherewith sport driving is presupposed, for example, what is currently done is that controllability during low-speed turns is to some extent sacrificed, and the urging force of the elastic members 112 is set on the high side in a configuration wherewith an adequate differential motion limiting condition can be realized at high speed or under heavy loading.

SUMMARY OF THE INVENTION

An object of the present invention is to provide differential gears wherewith adequate differential motion limiting action can be obtained even under heavy loading and wherewith also a differential motion condition and differential motion limiting condition can be suitably switched between.

The applicant, as a result of assiduous investigations into how to increase the area of the friction pressing portion in clutch means, arrived at the idea of it being possible to omit the side wall 103a of the pressure rings 103 in the differential gears 100 and 120 diagrammed in FIGS. 15 and 16, and deploy clutch plates within the thickness t of the side wall 103a, and thereby were able to perfect first and second differential gears relating to the present invention.

A first embodiment of differential gears relating to the present invention comprise: a differential case that is turned by the drive force from the engine about the left and right wheel axles; a pair of left and right side gears deployed, respectively, at the ends of the left and right wheel axles, so as to be incapable of relative turning; a pair of left and right pressure rings deployed inside the differential case so as to freely move in the direction of the wheel axles, but be incapable of relative turning, and so as to cover the outer circumferential sides of the left and right side gears, respectively, the inner diameter of at least one of the pressure rings being set larger than that of the side gears; a pinion shaft deployed perpendicularly to the wheel axles with the ends thereof held between the left and right pressure rings; at least one pair of pinion gears that are deployed so as to turn freely on the pinion shaft, and mesh with the left and right side gears; a set of clutch means that are deployed on both sides of the two pressure rings in the direction of the wheel axles, and comprises first clutch plates fitted into the differential case so as to move freely in the direction of the wheel axles but be incapable of relative turning, and second clutch plates fitted over the sleeves in the side gears so as to move freely in the direction of the wheel axles but be incapable of relative turning, the first and second clutch plates being deployed alternately so that the clutch means are capable of limiting the differential motion of the left and right wheel axles by limiting the relative turning of the differential case and the side gears by friction between the first and second clutch plates; urging means for urging the two pressure rings in a direction such that the clearance between the two pressure rings narrows; and actuation means for actuating the pressure rings against the urging force of the urging means, in a direction such that the clearance between the two pressure rings increases, in accordance with increases in the relative turning torque between the pinion shaft and the differential case during differential motion, and activating the clutch means.

In this first embodiment of differential gears, when the turning resistance on the left and right wheels is the same, the pinion gears, side gears, pinion shaft, and pressure rings turn integrally with the differential case, and the left and right wheels turn at the same speed. When the turning resistance on the two wheels differs, however, the pinion gears revolve while meshing with the side gears due to a portion of the turning force acting on the differential case, and a differential motion condition is switched to wherewith the turning speed of the wheel on the side of lower turning resistance becomes faster than the turning speed of the wheel on the side of higher turning resistance is switched to, or a differential motion limiting condition is switched to wherewith the relative turning of the side gears and differential case is limited by the clutch means, and a portion of the turning torque acting on the differential case is distributed toward the wheel affected by larger turning resistance.

More specifically, when the turning resistance on the left and right wheels differs, in response to the relative turning torque between the pinion shaft and the differential case due to the actuation means, the actuation force in the direction wherewith the clearance between the two pressure rings increases acts on both pressure rings. However, when the actuation force produced by these actuation means is smaller than the urging force produced by the urging means, the clearance does not change, and a normal differential motion condition is obtained, whereas, when that force becomes larger than the urging force, the clearance between the two pressure rings becomes larger in response thereto, and the clutch plates of the clutch means are friction pressed against each other, whereupon the differential motion of the left and right wheels will be limited.

Now, in the first embodiment of differential gears, because the inner diameter of at least one of the pressure rings is set larger than the diameter of the side gears, it is possible to configure the pressure rings so that the material thickness thereof is thin in the axial direction, making it possible to increase the number of clutch plates that can be accommodated by that measure. Furthermore, while it is permissible to set the inner diameter of only one pressure ring larger than the diameter of the side gears, in order to increase the number of clutch plates accommodated as much as possible, it is preferable that the inner diameters of the left and right pressure rings be set larger than the diameters of the side gears.

A second embodiment of differential gears relating to the present invention comprise: a differential case that is turned by the drive force from the engine about the left and right wheel axles; a pressure ring deployed inside the differential case so as to freely move in the direction of the wheel axles but be incapable of relative turning, and so as to cover the outer circumferential side of one of the side gears noted above, the inner diameter of the pressure ring being set larger than that of the side gear; a pinion shaft deployed perpendicularly to the wheel axles with the ends thereof held between the pressure ring and the surface of the differential case facing the pressure ring; at least one pair of pinion gears, deployed so as to turn freely on the pinion shaft, that mesh with the left and right side gears; clutch means that are deployed on the side of the pressure ring opposite to the surface facing the pressure ring, and comprises first clutch plates fitted into the differential case so as to move freely in the direction of the wheel axles but be incapable of relative turning, and second clutch plates fitted over the sleeves in the side gears so as to move freely in the direction of the wheel axles but be incapable of relative turning, the first and second clutch plates being deployed alternately so that the clutch means are capable of limiting the differential motion of the left and right wheel axles by limiting the relative turning of the differential case and the side gears by friction between the first and second clutch plates; urging means for urging the pressure ring in a direction such that the clearance between the pressure ring and the surface facing the pressure ring narrows; and actuation means for actuating the pressure ring against the urging force of the urging means, in a direction such that the clearance between the pressure ring and the surface facing the pressure ring increases, in accordance with increases in the relative turning torque between the pinion shaft and the differential case during differential motion, and activating the clutch means.

In the second embodiment of differential gears, in basically the same way as in the differential gears described in claim 1, switching is effected between a non-differential motion condition wherein the left and right wheels turn at the same speed, a differential motion condition wherein the turning speed of the wheel on the side of lower turning resistance becomes faster than the turning speed of the wheel on the side of higher turning resistance, and a differential motion limiting condition wherein a portion of the turning torque acting on the differential case is distributed toward the wheel affected by the higher turning resistance.

More specifically, when the turning resistance on the left and right wheels differs, in response to the relative turning torque between the pinion shaft and the differential case due to the actuation means, the actuation force in the direction wherewith the clearance between the pressure ring and the ring opposing surf ace increases acts on the pressure ring. However, when the actuation force produced by these actuation means is smaller than the urging force produced by the urging means, the clearance does not change, and a normal differential motion condition is obtained, whereas, when that force becomes larger than the urging force, the clearance between the pressure ring and the ring opposing surface becomes larger in response thereto, and the clutch plates of the clutch means are friction pressed against each other, whereupon the differential motion of the left and right wheels will be limited.

Also, because the inner diameter of the pressure ring is set larger than the diameter of the side gear, it is possible to configure the pressure ring so that the material thickness thereof is thin in the axial direction, making it possible to increase the number of clutch plates that can be accommodated by that measure.

In the second embodiment of differential gears, furthermore, because only one set of clutch means need be incorporated, in addition to being able to make the differential gears easier to assemble, it is now possible to incorporate clutch means on the side thereof which has room to spare, making it possible to set the size of the clutch plates as large as possible and enhance the friction pressure force while configuring the differential gears in a small size. For that reason, the differential gears can be used suitably with engines designed for horizontal mounting wherein the restrictions on differential case shape and size are severe. Furthermore, when only one set of clutch means is provided in this manner, the relative turning between the one side gear and the differential case will be directly limited by the clutch means, while the relative turning between the other side gear and the differential case will be limited by the clutch means via the pinion and one side gear.

The applicant also arrived at the idea of it being possible to make clutch means deployed to both sides of the two pressure rings in the direction of the wheel axles in a left-right asymmetrical configuration wherein differences are imparted in the number of sets of clutch plates and/or in the outer diameters thereof, and thereby was able to perfect a third embodiment of differential gears relating to the present invention.

The third embodiment of differential gears relating to the present invention comprise: a differential case that is turned by the drive force from the engine about the left and right wheel axles; a pair of left and right pressure rings deployed inside the differential case so as to freely move in the direction of the wheel axles but be incapable of relative turning; a pinion shaft deployed perpendicularly to the wheel axles with ends thereof held between the two pressure rings; at least one pair of pinion gears deployed so as to turn freely on the pinion shaft; a pair of left and right side gears, deployed at the axle ends of the left and right wheel axles, respectively, so as to be incapable of relative turning, and so as to sandwich the pinion gears and mesh with the pinion gears on both sides thereof; a set of left and right clutch means that are deployed on both sides of the two pressure rings in the direction of the wheel axles, and are capable of limiting the differential motion of the left and right wheel axles by limiting the relative turning between the differential case and the side gears, the outer diameters and/or the number of clutch plates per set being different between the left and right clutch means; urging means for urging the two pressure rings in a direction such that the clearance between the two pressure rings narrows; and actuation means for actuating the pressure rings against the urging force of the urging means, in a direction such that the clearance between the two pressure rings increases, in accordance with increases in the relative turning torque between the pinion shaft and the differential case during differential motion, and activating the clutch means.

In this third embodiment differential gears, in the same way as in the first embodiment, switching is effected between a non-differential motion condition wherein the left and right wheels turn at the same speed, a differential motion condition wherein the turning speed of the wheel on the side of lower turning resistance becomes faster than the turning speed of the wheel on the side of higher turning resistance, and a differential motion limiting condition wherein a portion of the turning torque acting on the differential case is distributed toward the wheel affected by the higher turning resistance.

Also, because a difference is imparted in the outer diameters and/or the number of sets of clutch plates in the two sets of clutch means, it is possible to adjust the outer diameters or number of sets of clutch plates according to the shape of the differential case, and, while avoiding a portion of wasteful material thickness from being formed in the differential case, to incorporate clutch plates in the differential case without gaps, whereupon the area of the friction pressure portion of the clutch plates is increased as much as possible, and adequate differential motion limiting action is obtained even under heavy loading.

Here, in addition to differentiating the diameters of the clutch plates between the left and right clutch means in the third embodiment of differential gears, splines are provided for fitting clutch plates inside the differential case so as to move freely in the axial direction but be incapable of relative turning, and the pitch of the splines for the clutch plates of smaller diameter may be set larger than the pitch of the splines for the clutch plates of larger diameter. That is, the portion of the differential case wherein the clutch plates of small diameter are fit is small in diameter and on the back side of the differential case, and spline machining workability for that portion is not very good. It is therefore preferable that the pitch of the small-diameter clutch plates be set larger than the pitch of the large-diameter clutch plates, in a configuration that reduces the work involved in machining the splines for the differential case.

It is also permissible to set the inner diameter of at least one of the pressure rings larger than the diameter of the side gears. When that is the case, because the inner diameter of that at least one pressure ring is set larger than the diameter of the side gears, it is possible to configure the pressure ring with a thin material thickness in the axial direction, making it possible to increase the number of clutch plates that can be accommodated by that measure. Furthermore, while it is permissible to set the inner diameter of only one pressure ring larger than the diameter of the side gears, in order to increase the number of clutch plates accommodated as much as possible, it is preferable that the inner diameters of the left and right pressure rings be set larger than the diameters of the side gears.

In the first, second, and third embodiments of differential gears, it is preferable that collars be provided which are fitted over the sleeves of the side gears such that those collars are incapable of relative turning, and that, for the clutch means, use be made of means having first clutch plates fit into the differential case so that they move freely in the direction of the wheel axles but are incapable of relative turning, and second clutch plates fit over the side gear collars so that they move freely in the direction of the wheel axles but are incapable of relative turning. In other words, it is also possible to form splines or the like in the side gear sleeves and assemble the second clutch plates therewith so as to move freely in the axial direction but be incapable of mutual turning, but, because of the machining difficulties involved in forming splines all the way to the gears of the side gears, it is preferable to assemble collars comprising separate members with the sleeves of the side gears, and then mount the second clutch plates so that they fit thereover.

When that is done, it is also preferable that the collars be configured so as to have substantially the same diameter as the side gears but be smaller in diameter than the inner diameter of the pressure rings, and that the ends of the collars be inserted inside the pressure rings. When the configuration is made in that way, the second clutch plates are definitely prevented from coming off of the collars on the side toward the gears of the side gears.

In the first, second, and third embodiments of differential gears, furthermore, for the urging means, it is preferable that urging means be provided which urge the pressure rings in a direction such that the clearance narrows, without the intervention of the clutch means. When that is the case, the clutch plates of the clutch means will not be friction pressed even when the urging force of the urging means is set high, and the timing of the switching from the differential motion condition to the differential motion limiting condition will be made dependent only on the actuation force of the actuation means and the urging force of the urging means. Thus it becomes possible to make the configuration such that, by setting the urging force of the urging means properly, the differential motion condition is definitely obtained during low-speed turning, and the differential motion limiting condition is definitely obtained when turning at high speed or under heavy loading.

DESCRIPTION OF THE PREFERRED EMBODIMENTS

Embodiments of the present invention are hereinafter described while making reference to the drawings. means.

First Differential Gears

Figure 1:
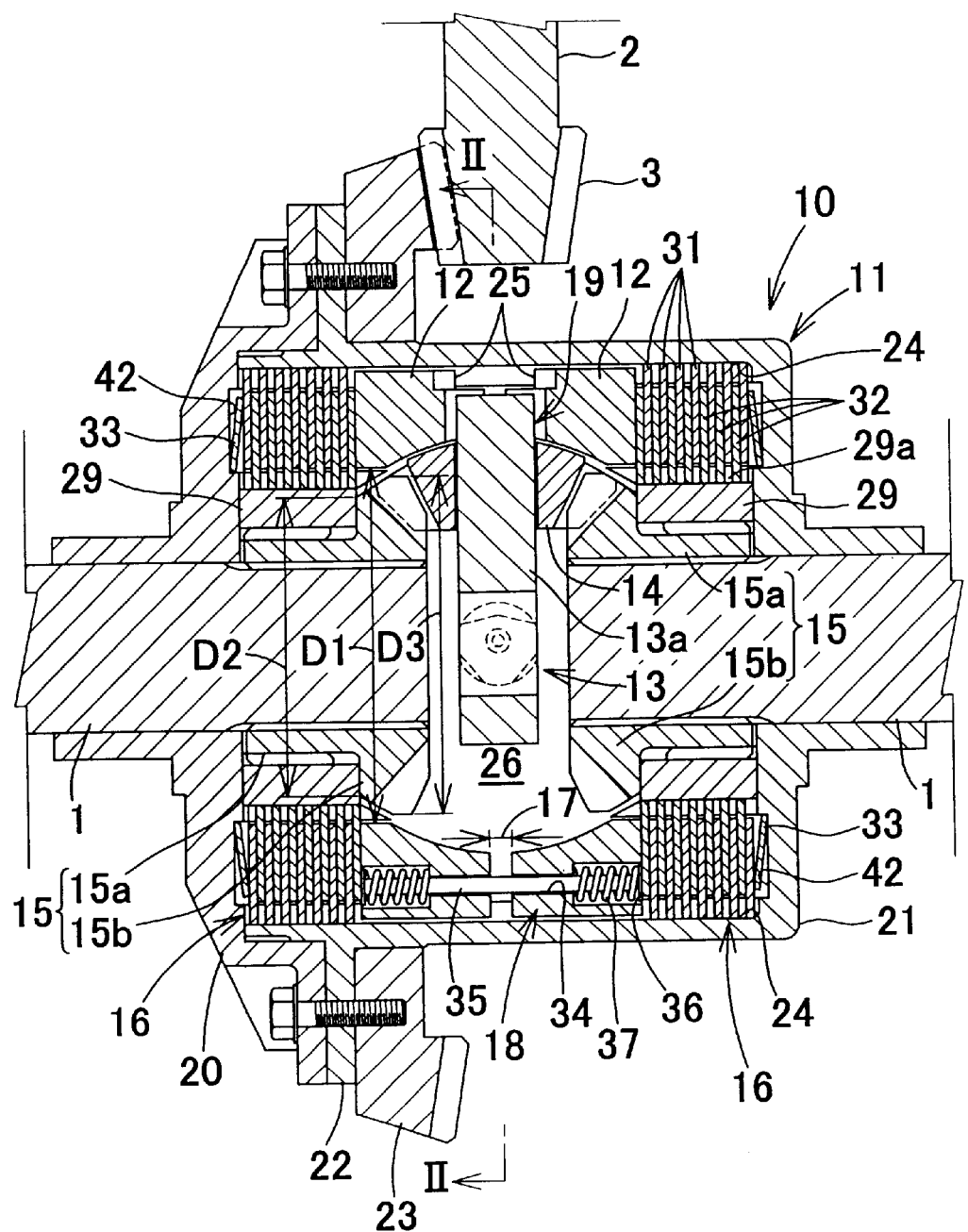
FIG. 1 is a horizontal section of differential gears (section at I—I line in FIG. 2)
Figure 2:
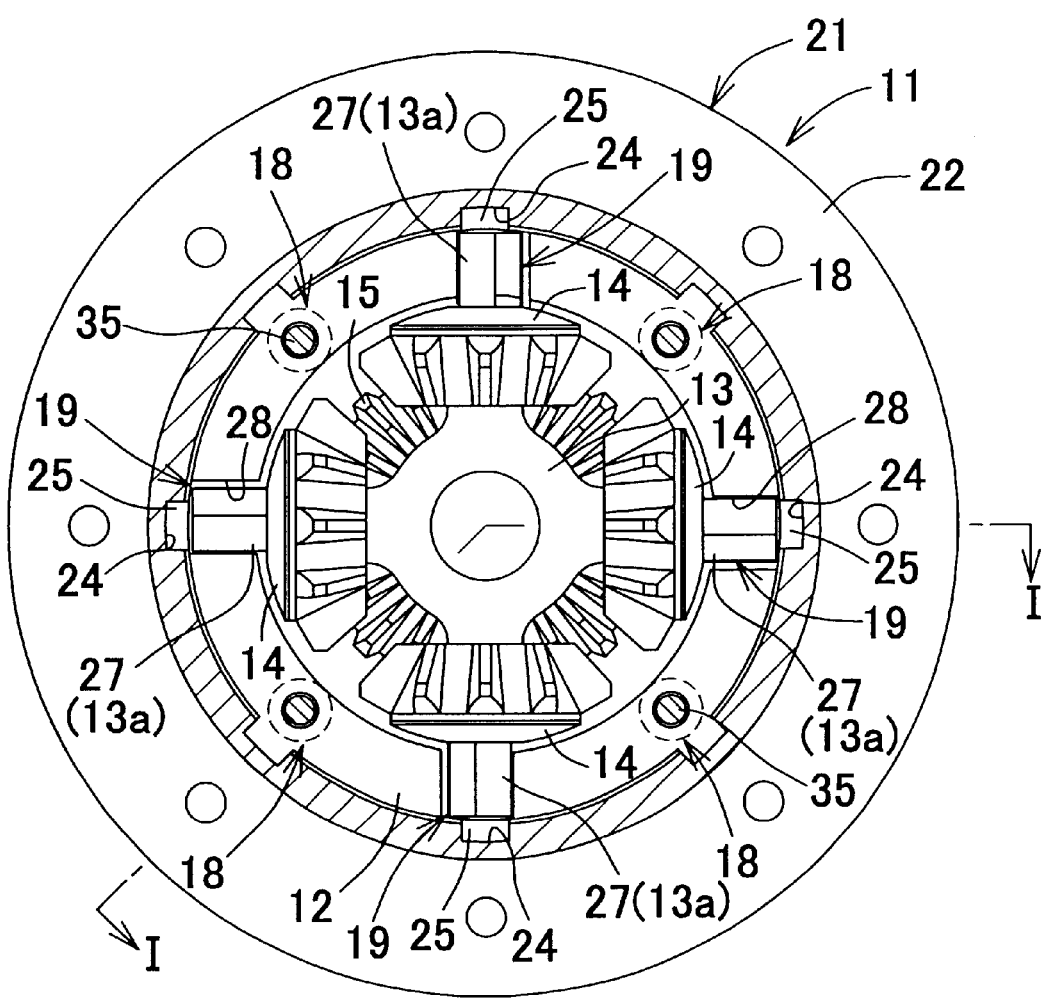
FIG. 2 is the section at the II—II line in FIG. 1.

As diagrammed in FIG. 1 and FIG. 2, these differential gears 10 comprise a differential case 11 that is turned by the drive force from the engine about a turning center of the left and right wheel axles 1, a pair of left and right side gears 15 deployed respectively so as to be incapable of relative turning, at the axle ends of the left and right wheel axles 1, a pair of left and right pressure rings 12 deployed inside the differential case 11 so as to freely move in the direction of the wheel axles but be incapable of relative turning, and so as to cover the outer circumferential sides of the left and right side gears 15, respectively, having an inner diameter D1 set larger than the outer diameter of the side gears 15, a pinion shaft 13 deployed perpendicularly to the wheel axles 1 in a condition wherein the shaft ends thereof are caused to be held between the left and right pressure rings 12, at least one pair of pinion gears 14, deployed so as to turn freely on the pinion shaft 13, that mesh with the left and right side gears 15, clutch means 16 constituting one set of clutch means 16 deployed on both sides of the two pressure rings 12 in the direction of the wheel axles, having: first clutch plates 31 fitted into the differential case 11 so as to move freely in the direction of the wheel axles but be incapable of relative turning, and second clutch plates 32 fitted over sleeves 15a in the side gears 15, via collars 29 that are fit over and secured thereto so as to be incapable of relative turning, so as to move freely in the direction of the wheel axles but also be incapable of relative turning, wherein the two sets of clutch plates 31 and 32 are deployed so as to alternate, and which clutch means are capable of limiting the differential motion of the left and right wheel axles 1 by limiting the relative turning of the differential case 11 and the side gears 15 by friction between the two sets of clutch plates 31 and 32, urging means 18 for urging the two pressure rings 12 in a direction such that the clearance 17 between the two pressure rings 12 narrows, and actuation means 19 for actuating the pressure rings 12 in opposition to the urging force of the urging means 18, in a direction such that the clearance 17 between the two pressure rings 12 increases, in response to increases in the relative turning torque between the pinion shaft 13 and the differential case 11 during differential motion, and activating the clutch means 16.

The configuration of the differential case 11 is divided between a cover member 20 and a main case body 21. The cover member 20 is secured to a flange 22 formed in the left end of the main case body 21. To the flange 22, on the side opposite from the cover member 20, is secured a ring gear 23. This ring gear 23 is meshed with a drive pinion 3 provided in a drive shaft 2 extending from the engine. In the differential case 11, the axle ends of left and right wheel axles 1 are inserted and passed through the cover member 20 and the right wall of the main case body 21 so as to be concentric. The differential case 11 is configured so as to be driven to turn, about the turning center of the wheel axles 1, by the driving force from the engine, via the drive pinion 3 and the ring gear 23.

On the inner circumferential surface of the main case body 21 are formed channels 24, in a plural number, at a set interval in the circumferential direction, extending over the entire length thereof in the direction of the wheel axles. Inside the main case body 21, a pair of left and right ring-shaped pressure rings 12 are deployed with partially spherical inner surface sides set in opposition. In the outer circumferential surfaces of the two pressure rings 12 are formed projecting ridges 25 which respectively engage the channels 24. The two pressure rings 12, by the engagement between the projecting ridges 25 and the channels 24, are deployed inside the main case body 21 so that they freely move in the direction of the wheel axles but are incapable of relative turning. It is possible, furthermore, to freely determine the size and shape of the differential case 11 to suit the vehicle. Also, so long as the channels 24 and the projecting ridges 25 are configured so as to guide the pressure rings 12 relative to the differential case 11 so that they freely move in the direction of the wheel axles but are incapable of relative turning, they can be formed with any cross-sectional shape. The number thereof is made 8 in the differential gears 10 diagrammed in the figures, but that number can be set freely.

Inside a gear chamber 26 formed between the two pressure rings 12 is deployed a substantially cross-shaped pinion shaft 13. In the pinion shaft 13 are formed four shafts 13a which extend in directions perpendicular to the wheel axles 1. The pinion gears 14 are supported so that they turn freely by the shafts 13a. The number of the pinion gears 14 can be set to any number, but at least one pair is to be provided.

Figure 3:
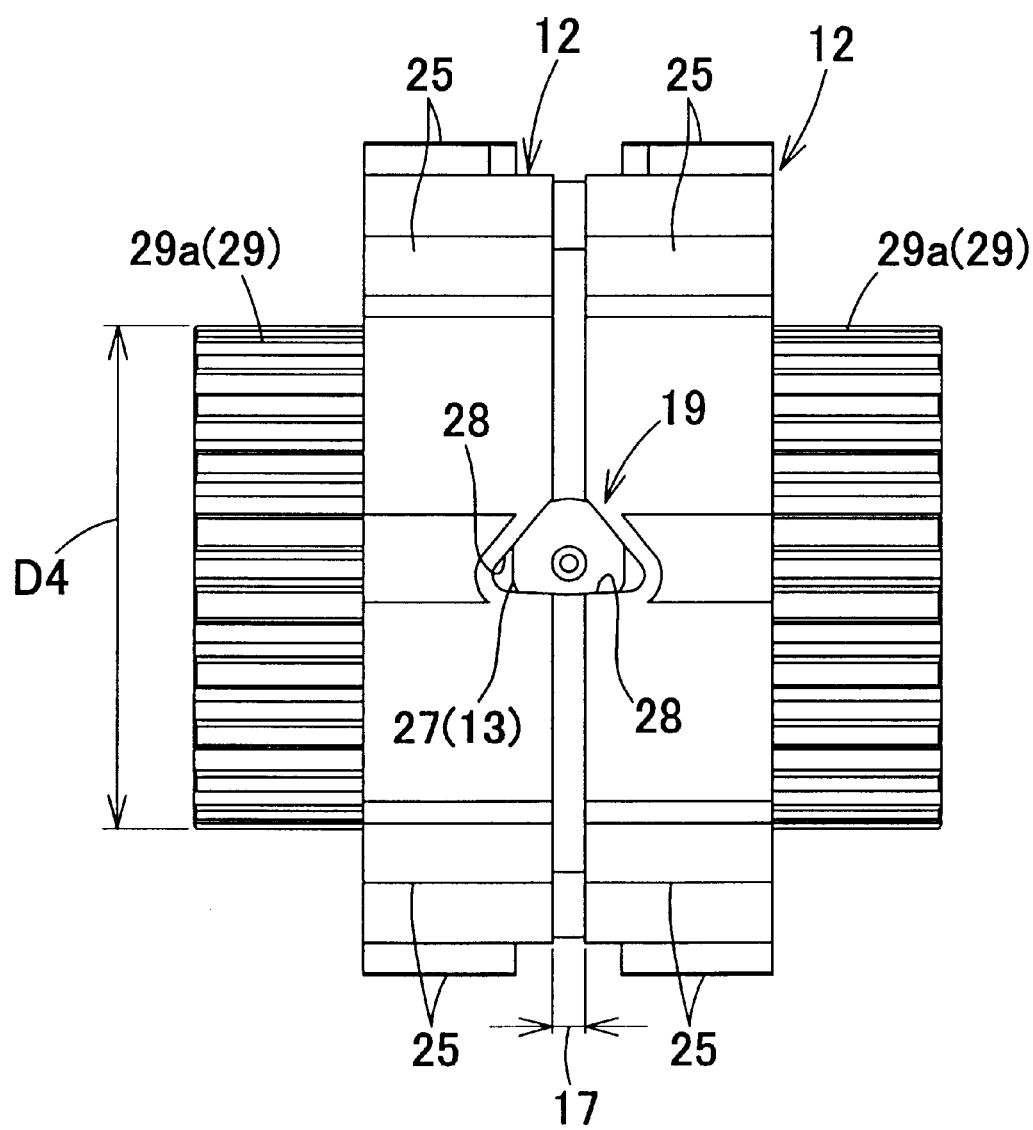
FIG. 3 is a front elevation of pressure rings and members assembled therewith.
Figure 4:
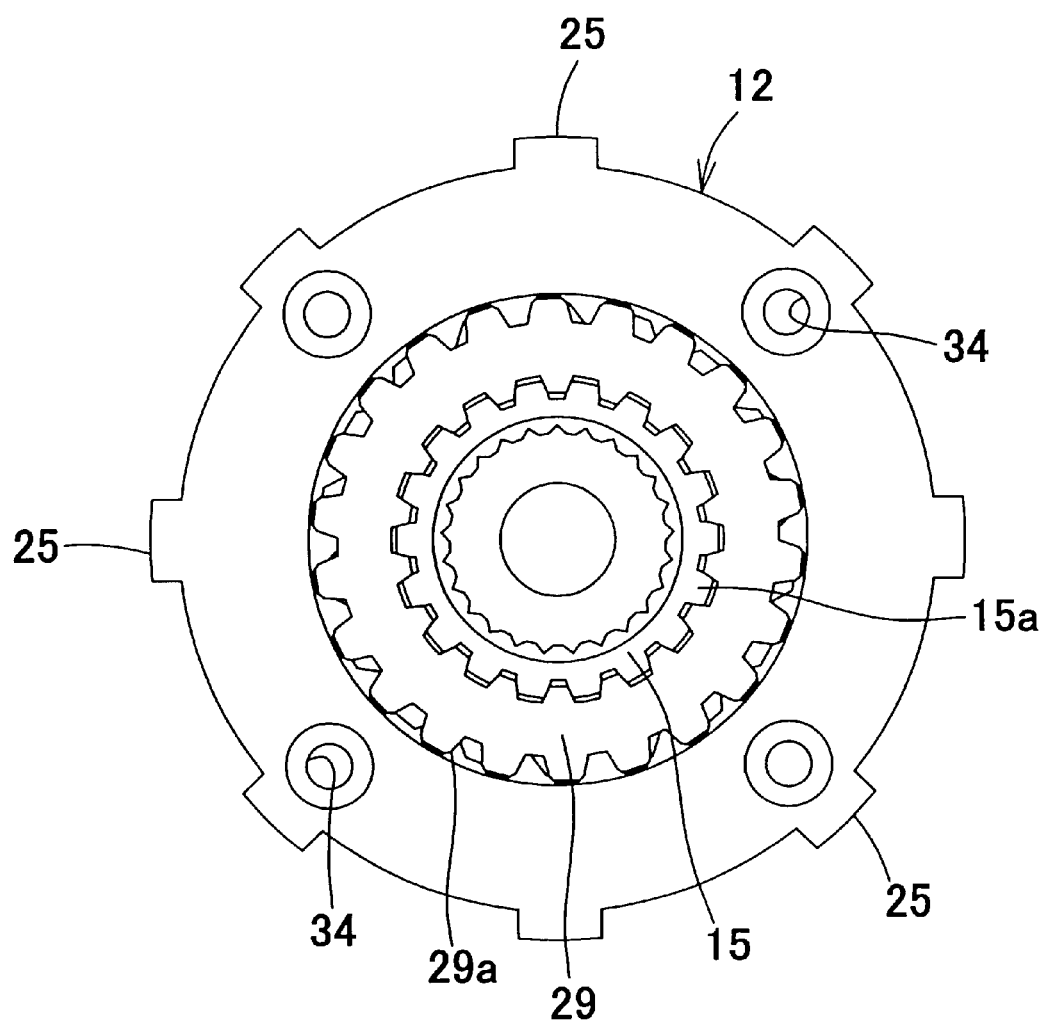
FIG. 4 is a side elevation of pressure rings and members assembled therewith.
Figure 5:
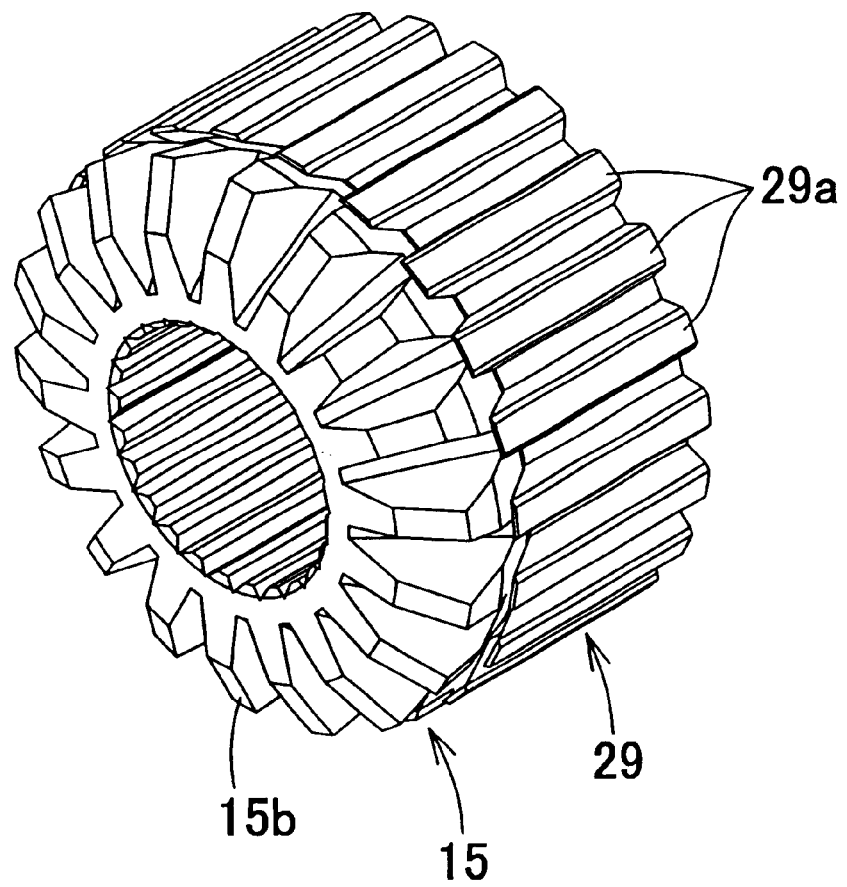
FIG. 5 is a perspective view of a side gear and collar.
Figure 6:
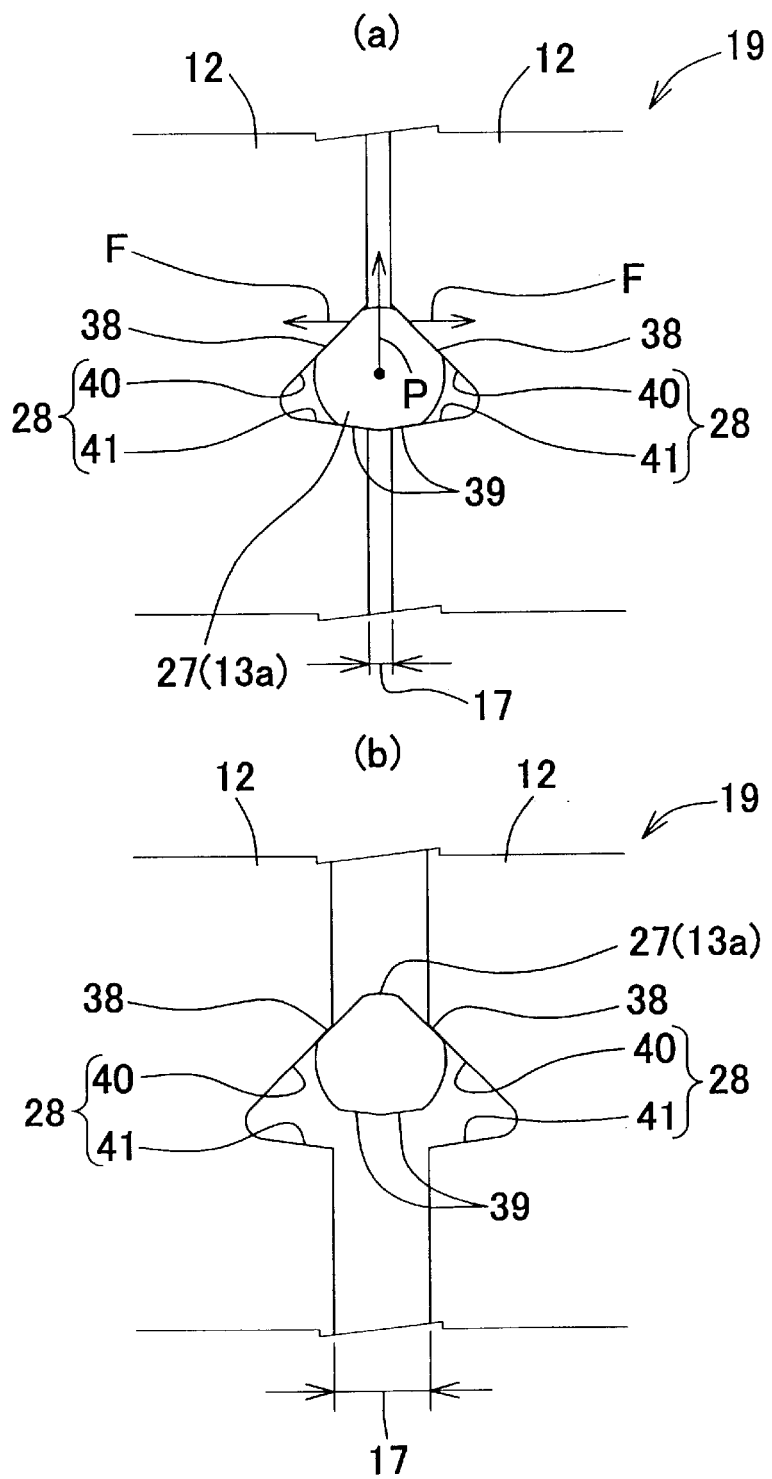
FIG. 6 is a diagram for explaining the action of actuation means.

As diagrammed in FIGS. 2, 3, and 6, cams 27 are formed on the shaft ends of the pinion shaft 13, and cam channels 28 made to correspond with the cams 27 are respectively formed in the opposing surface side portions of the outer walls of the two pressure rings 12. The pinion shaft 13 is supported inside the gear chamber 26 by the cams 27 of the shafts 13a being held sandwiched between the cam channels 28 of the two pressure rings 12. The actuation means 19 are also configured by the cams 27 and the cam channels 28, a description whereof is given further below.

As diagrammed in FIGS. 1 to 5, inside the gear chamber 26 are deployed one pair of side gears 15 which sandwich the pinion gears 14 and mesh with the pinion gears 14 on either side thereof. The left and right wheel axles 1 pass through the pressure rings 12 and protrude into the gear chamber 26. The left and right side gears 15 are connected respectively to the shaft ends of the left and right wheel axles 1 by a spline fitting or the like so that they are incapable of relative turning. In the two side gears 15, sleeves 15a which pass through the pressure rings 12 along the wheel axles 1 and extend toward the outside are integrally formed. In the sleeves 15a, the collars 29 are spline-fit along substantially the entire length thereof so that they are incapable of relative turning, while in the outer circumference of the collars 29, splines 29a are formed which extend in the direction of the wheel axles, across the entire length thereof. The sleeves 15a and the collars 29, furthermore, so long as they are incapable of relative turning, may be joined by keys and key channels or ridge channels and projecting ridges or the like instead of by spline fitting, or they may be joined by welding or the like.

On both sides of the two pressure rings 12 in the direction of the wheel axles, clutch means 16 are respectively mounted externally through the collars 29 to the sleeves 15a of the side gears 15. The left and right clutch means 16 have first clutch plates 31 and second clutch plates 32 deployed so as to alternate, with the first clutch plates 31 fitted into the differential case 11 so that, by the channels 24 in the differential case 11, they move freely in the direction of the wheel axles but are incapable of relative turning, and the second clutch plates 32 are fitted over the sleeves 15a, via the splines 29a of the collars 29, so that they move freely in the direction of the wheel axles but are incapable of relative turning. The configuration is made such that, when the clutch plates 31 and 32 press against each other, friction develops between the adjacent clutch plates 31 and 32, and, in response thereto, the relative turning between the differential case 11 and the side gears 15 is limited. It is possible to set the number of clutch plates 31 and 32 to any number, but when that number is too few, the differential motion limiting function will not be adequately manifested, wherefore it is preferable to provide as many clutch plates 31 and 32 as the size of the differential case 11 will allow.

The characteristic configuration of the invention is seen in the fact that the number of clutch plates 31 and 32 capable of being accommodated in the differential gears 10 is increased to the extent possible, with provision made so that, substantially, the pressure rings 12 are not deployed between the gears 15b of the side gears 15, on the one hand, and clutch plates 31 and 32, on the other. In order to realize this configuration, the inner diameter D1 of the pressure rings 12 should be set somewhat larger than the outer diameter D2 at the bases of the teeth of the gears 15b of the side gears 15, and preferably somewhat larger than the outer diameter D3 at the tips of the teeth thereof.

In order to prevent the second clutch plates 32 from coming off of the collars 29 on the side toward the gears 15b, moreover, the outer diameter D4 of the collars 29 is configured somewhat larger than the outer diameter D3 of the side gears 15, while the inner diameter D1 of the pressure rings 12 is configured somewhat larger than the outer diameter D4 of those collars 29, and the ends of the collars 29 are inserted into the pressure rings 12, thereby preventing the second clutch plates 32 from coming off.

By setting the inner diameter of the pressure rings 12 larger than the diameters of the side gears 15 and the collars 29 in this manner, it becomes possible to configure the pressure rings 12 with thinner material thickness in the direction of the wheel axles than in the prior art, to provide so that the outer end surfaces of the pressure rings 12 in the direction of the wheel axles and the outer end surfaces of the gears 15b of the side gears 15 in the direction of the wheel axles become substantially flat, and to deploy the clutch plates 31 and 32 of the clutch means 16 so that they approach as close as possible to the gears 15b. By that measure, the number of clutch plates 31 and 32 built into the assembly is increased, the friction pressure portion of the clutch plates 31 and 32 is increased, and adequate differential motion limiting action is obtained even under heavy loading.

In this embodiment, furthermore, the configuration is made such that the side gears 15 and the collars 29 are divided, but it is also possible to implement a unified configuration. However, splines will in that case be formed in the outer circumferences of the sleeves 15a in order to support the second clutch plates 32 so that they move freely in the axial direction relative to the sleeves 15a, but, it being very difficult to form splines in the sleeves 15a in the vicinity of the gears 15b, the number of clutch plates 31 and 32 that can be assembled therein is diminished by that measure, wherefore the spline pitch should be set the same as the pitch of the teeth of the side gears 15, and spline teeth which extend continuously from the teeth of the side gears 15 toward the outside in the axial direction should be formed.

Channels 42 are formed in the right wall of the main case body 21 and in the cover member 20, and, in the channels 42 on the outside of the clutch means 16, plate springs 33 are provided which urge the clutch plates 31 and 32 respectively toward the pressure rings 12 side. These plate springs 33 are deployed with the object of eliminating play between the clutch plates 31 and 32, and are set with a level of urging force wherewith almost no frictional forces act between the clutch plates 31 and 32. However, when it is possible to assemble the clutch means 16 so that play is more or less eliminated, the plate springs 33 may be omitted. In this embodiment, moreover, in order to increase the number of the clutch plates 31 and 32 as much as possible, the plate springs 33 are accommodated in the channels 42, but it is also possible to provide the plate springs 33 without forming the channels 42.

Between the two pressure rings 12, urging means 18 are deployed which urge those rings in a direction wherewith they will approach each other. More specifically, in the pressure rings 12, through holes 34 are formed, between the shaft ends of the shafts 13a adjacent to the pinion shaft 13, and into these through holes 34 are loaded rod members 35 which extend across both pressure rings 12. The rod members 35 are established in a length wherewith they will not protrude outside the pressure rings 12 even when the two pressure rings 12 are the closest together, that is, even when the clearance 17 between the two pressure rings 12 has reached the minimum, and flanges 36 are formed on the ends of the rod members 35. To the left and right portions of the rod members 35 are externally mounted elastic members 37, respectively, which comprise compressed coil springs. The two pressure rings 12 are always urged by the urging force of the elastic members 37 so as to mutually approach each other via the rod members 35.

It is possible, furthermore, to make the urging means 18 of any configuration, and deploy them in any number in any position, so long as they are configured so that it is thereby possible to urge the two pressure rings 12 in a direction such that they mutually approach each other, without the intervention of the clutch means 16. For example, instead of the rod members 35, rod members may be used each of which has screw threads formed in one end thereof, such that those threaded ends of the rod members are screwed into one of the pressure rings 12. Doing so is preferable because the task of assembling the urging means 18A is then made easy. In that case, moreover, it is also possible to deploy the rod members so that the threaded parts of adjacent rod members are positioned opposite each other left and right. Instead of the elastic members 37 which comprise compressed coil springs, elastic members comprising plate springs or synthetic rubber or the like may also be used, or pulling springs or the like may be used to pull the two pressure rings 12 in a direction such that they approach each other. It is also possible to deploy urging means between the differential case 11 and the pressure rings 12.

Alternatively, when deployed between those shaft ends that are adjacent to the pinion shaft 13 in the pressure rings 12, as described in the foregoing, it is possible to cause the urging means to be deployed inside the dead space between the shaft ends, the pressure rings 12 and the differential case 11 can be configured in a small size in the radial dimension, and the shaft ends of the pinion shaft 13 can be extended out to the vicinity of the inner surface of the differential case 11, and the contact area between the cams 27 and cam channels 28 of the actuation means 19 described next increased. Therefore, wear and damage in the two members resulting from the relative turning torque acting between the cams 27 and the cam channels 28 can be effectively prevented, and the durability of the differential gears enhanced. However, it is also possible to position the rod members 35 of the urging means 18 further to the outside than the shaft ends of the pinion shaft 13 of the pressure rings 12. Providing such urging means 18 as these is to be preferred, moreover, but it is also possible to apply the present invention similarly to differential gears configured such that the urging means 18 are omitted, and the left and right pressure rings 12 are urged in a direction such that they will approach each other by the plate springs 33.

The actuation means 19, as diagrammed in FIG. 3 and FIG. 6, are configured with cams 27 deployed on the shaft ends of the four shafts 13a of the pinion shaft 13, and cam channels 28 formed respectively in the opposing portions of the two pressure rings 12. The cams 27 comprise a pair of actuation surfaces 38 formed in a substantially inverted V shape that are mirror symmetrical to the plane perpendicular to the wheel axles containing the centers of the shafts 13a, and abutting surfaces 39 which extend substantially in the direction of the wheel axles, formed so as to sandwich therebetween the centers of the shafts 13a, on the side opposite from the actuation surfaces 38. The cam channels 28 are formed in substantially right triangular shape with sloping cam surfaces 40 of a shape matching the actuation surfaces 38, and latching surfaces 41 of a shape matching the abutting surfaces 39.

Then, when, from the condition diagrammed in FIG. 6(a), the pinion shaft 13 exhibits minute relative turning in the direction indicated by the arrow P, relative to the pressure rings 12, as diagrammed in FIG. 6(b), the two pressure rings 12 move in a direction such that they mutually separate via the actuation surfaces 38 and the sloping cam surfaces 40, but, when they try to exhibit minute relative turning to the side opposite that indicated by the arrow P, the abutting surfaces 39 are latched by the latching surfaces 41, and the relative turning between the two pressure rings 12, on the one hand, and the pinion shaft 13, on the other, is restricted. For the actuation means 19, however, means of any configuration can be adopted so long as they are capable of actuating the two pressure rings 12 in a direction such that they will mutually separate, by the relative turning torque between the pinion shaft 13 and the differential case 11. As indicated as an example under "Description of the Related Art," means may be adopted wherewith, for the cams 27, cams 27 having a substantially square or diamond shape are formed wherein one diagonal is oriented substantially in the direction of the wheel axles, and, for the cam channels 28, substantially V-shaped cam channels that match the cams are formed.

Next, the action of the differential gears 10 is described.

In the differential gears 10, when the turning resistance on the left and right wheels is the same, the pinion gears 14, side gears 15, pinion shaft 13, and pressure rings 12 all turn integrally with the differential case 11, and the left and right wheels turn at the same speed.

During forward travel, when the turning resistance on the wheel on one side becomes less, basically, a differential motion condition will ensue wherein the pinion gears 14 will revolve while meshing with the side gears 15, driven by part of the turning force acting on the differential case 11, and the turning speed of the wheel on the side of lesser turning resistance will become faster than that of the wheel on the side of larger turning resistance. However, at high speed or under heavy loading, a differential motion limiting condition ensues wherein the relative turning of the side gears 15 and the differential case 11 is limited by the friction pressure force between the clutch plates 31 and 32 of the clutch means 16, whereupon, while enhancing cornering ability at low speed, adequate controllability at high speed or under heavy loading can be secured.

More specifically, when a difference in turning resistance between the left and right wheels occurs during forward travel, then, as diagrammed in FIG. 6(a), a relative turning torque P develops in the direction indicated by the arrow P between the pinion shaft 13 and the differential case 11 due to the actuation means 19, and, due to that relative turning torque P, an actuation force F will act, via the actuation surfaces 38 of the cams 27 and the sloping cam surfaces 40 of the cam channels 28, on the two pressure rings 12 in the direction indicated by the arrow F wherewith the two pressure rings 12 will mutually separate. Thereupon, as diagrammed in FIG. 6(b), the pinion shaft 13 and the differential case 11 will try to effect minute turning, relatively, and the clearance 17 will try to increase due to the fact of the contact positions between the actuation surfaces 38 of the cams 27 and the sloping cam surfaces 40 of the cam channels 28 being displaced.

Meanwhile, due to the urging means 18, an urging force will always be acting on the pressure rings 12, seeking to make them approach each other, wherefore, when the actuation force F of the actuation means 19 is smaller than the urging force of the urging means 18, then, as diagrammed in FIG. 6(a), a minimum clearance 17 is maintained and a differential motion condition ensues. When the actuation force F becomes larger than the urging force, then, as diagrammed in FIG. 6(b), the clearance 17 becomes larger, according to the difference in force, the clutch plates 31 and 32 are pressed by the side surfaces of the two pressure rings 12, and the clutch plates 31 and 32 are friction pressed together, whereby the differential motion limiting condition ensues.

In the differential gears 10, moreover, because the two pressure rings 12 are urged by the urging means 18 in a direction wherewith they approach each other, without the intervention of the clutch means 16, it is possible to make the configuration such that the timing of the switching from the differential motion condition to the differential motion limiting condition will be dependent only on the actuation force F of the actuation means 19 and the urging force of the urging means 18, whereupon, by appropriately setting that urging force of the urging means 18, a differential motion condition will definitely be obtained during low-speed turning, and a differential motion limiting condition will definitely be obtained when turning at high speed or under heavy loading.

When the turning resistance on the wheel on one side becomes less during reverse travel, on the other hand, even should a relative turning torque develop between the pinion shaft 13 and the differential case 11, that relative turning torque will be arrested by the abutting surfaces 39 of the cams 27 being latched by the latching surfaces 41 of the cam channels 28, and the minute relative turning between the two will be restricted, wherefore a condition will ensue wherein minimum clearance 17 is maintained, and a differential motion limiting condition will ensue. However, it is also possible to make the configuration so that, even during reverse travel, in like manner as during forward travel, a differential motion condition and differential motion limiting condition will be switched between. When that is the case, for the actuation means 19, for example, means will be adopted wherewith the cams are formed in diamond or square shapes, as noted earlier, and the cam channels will be formed substantially in V shapes which match the cams.

Second Differential Gears

These second differential gears are an application of the present invention to differential gears for a horizontally mounted engine. Members that are the same as in the embodiment described above are indicated by the same symbols, and no further description thereof is given.

Figure 7:
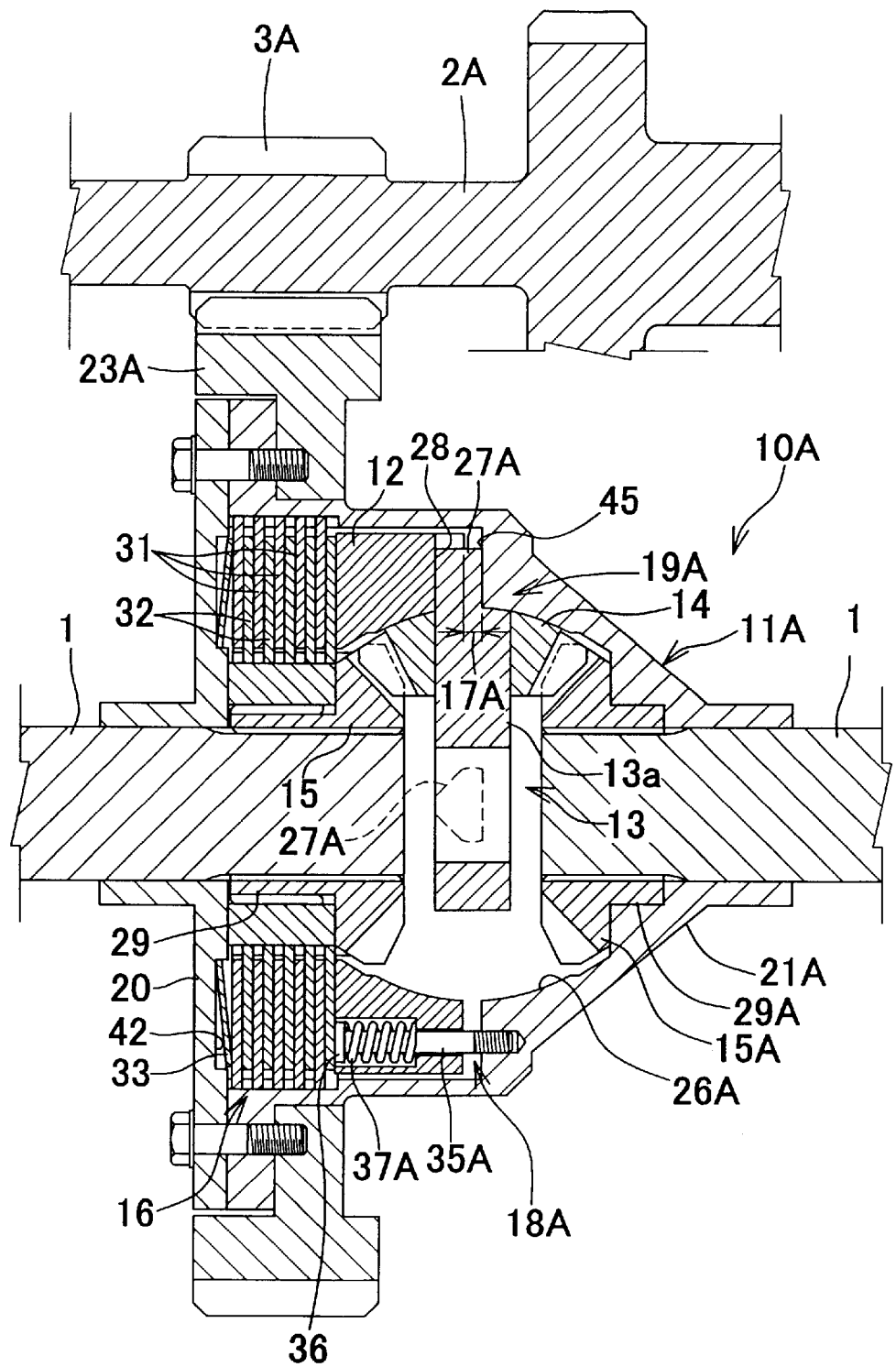
FIG. 7 is a diagram of differential gears having another configuration, corresponding to FIG. 1.

As diagrammed in FIG. 7, these differential gears 10A comprise a differential case 11A that is turned by the drive force from the engine about a turning center of the left and right wheel axles 1; a pressure ring 12 deployed inside the differential case 11A so as to freely move in the direction of the wheel axles but be incapable of relative turning, and so as to cover the outer circumferential side of one side gear 15, the inner diameter whereof is set larger than that of the side gear 15; a pinion shaft 13 deployed perpendicularly to the wheel axles 1 in a condition wherein the shaft ends thereof are caused to be held between the pressure ring 12 and a ring opposing surface 45 of the differential case 11A that opposes that pressure ring; at least one pair of pinion gears 14, deployed so as to turn freely on the pinion shaft 13, that mesh with the left and right side gears 15 and 15A; clutch means 16 deployed on the side of the pressure ring 12 opposite from the ring opposing surface 45, having: first clutch plates 31 fitted into the differential case 11A so as to move freely in the direction of the wheel axles but be incapable of relative turning; and second clutch plates 32 fitted over sleeves 15a in the side gear 15 so as to move freely in the direction of the wheel axles but also be incapable of relative turning; wherein the two sets of clutch plates 31 and 32 are deployed so as to alternate, and which clutch means are capable of limiting the differential motion of the left and right wheel axles 1 by limiting the relative turning of the differential case 11A and the side gears 15 and 15A by friction between the two sets of clutch plates 31 and 32; urging means 18A for urging the pressure ring 12 in a direction such that the clearance 17A between the pressure ring 12 and the ring opposing surface 45 narrows; and actuation means 19A for actuating the pressure ring 12 in opposition to the urging force of the urging means 18A, in a direction such that the clearance 17A between the pressure ring 12 and the ring opposing surface 45 increases, in response to increases in the relative turning torque between the pinion shaft 13 and the differential case 11A during differential motion, and activating the clutch means 16.

The differential case 11A is configured in a shape wherein the diameter of the right portion of the main case body 21A is reduced. The pressure ring 12 on the right side, clutch means 16 on the right side, and plate spring 33 on the right side present in the previously described embodiment are omitted. A gear chamber 26A is formed between the pressure ring 12 on the left side and the right portion of the main case body 21A, inside of which gear chamber 26A are mounted the pinion shaft 13, pinion gears 14, and side gears 15 and 15A. In place of the side gear 15 on the right side in the embodiment described earlier, moreover, a side gear 15A having no splines formed in the sleeve 15a thereof is adopted, and that side gear 15A is mounted so as to turn freely in the right portion of the main case body 21A.

In the portion opposed to the right end of the pressure ring 12 within the main case body 21A, a ring opposing surface 45 is formed so as to be perpendicular to the wheel axles 1, and in the shaft 3nds of the pinion shaft 13 are provided cams 27A, respectively, wherein the right halves of the cams 27 in the embodiment described earlier have been cut away. The pinion shaft 13 is supported between the pressure ring 12 and the main case body 21A by the cams 27A being held sandwiched between the cam channels 28 formed in the pressure ring 12 and the ring opposing surface 45 of the main case body 21A.

The actuation means 19A are configured with cam channels 28 and cams 27A. These actuation means 19A, which function basically in the same way as the actuation means 19 described earlier, are configured so that, when a relative turning torque develops between the pinion shaft 13 and the differential case 11A, the pressure ring 12 is actuated so as to mutually separate from the ring opposing surface 45, so that the clearance 17A between the pressure ring 12 and the ring opposing surface 45 increases.

The urging means 18A comprise rod members 35A, and elastic members 37A comprising compressed coil springs. On the left ends of the rod members 35A are formed flanges 36, while in the right portions thereof are formed screw threads. Then, the rod members 35A, in a condition wherein the elastic members 37A are mounted externally to the rod members 35A, are inserted into through holes formed in the pressure ring 12, and fastened securely to the main case body 21A. The pressure ring 12 is always urged by these urging means 18A toward the ring opposing surface 45 side, that is, toward the side whereat the clearance 17A between the pressure ring 12 and the ring opposing surface 45 narrows. As in the embodiment described earlier, moreover, these urging means 18A can be deployed in any number or position.

In the differential gears 10A, as in the differential gears 10, when the turning force from an engine drive shaft 2A is transmitted via a drive pinion 3A and a ring gear 23A to the differential case 11A, if the turning resistance on the left and right wheels is the same, the pinion gears 14, side gears 15 and 15A, pinion shaft 13, and pressure ring 12 will turn integrally with the differential case 11A, and the left and right wheels will turn at the same speed. During forward travel, moreover, basically, a differential motion condition will ensue wherein the pinion gears 14 will revolve while meshing with the side gears 15 and 15A, driven by part of the turning force acting on the differential case 11A, and the turning speed of the wheel on the side of lesser turning resistance will become faster than that of the wheel on the side of larger turning resistance. However, at high speed and under heavy loading, the pressure ring 12 is moved by the actuation means 19A in a direction away from the ring opposing surface 45, resulting in a differential motion limiting condition where the relative turning of the side gears 15 and 15A and the differential case 11A is limited by the friction pressure force between the clutch plates 31 and 32 of the clutch means 16, and thereby while enhancing cornering ability at low speed, adequate controllability at high speed or under heavy loading can be secured. Furthermore, although the clutch means 16 are not provided in the side gear 15A on the right side, the differential motion between the side gear 15A and the differential case 11A when the differential motion is being limited will be limited by the clutch means 16 through the pinion gears 14 and the side gear 15 on the left side.

Moreover, because the pressure ring 12 is urged by the urging means 18A toward the ring opposing surface 45 side, without the intervention of the clutch means 16, it is possible to make the configuration such that the timing of the switching from the differential motion condition to the differential motion limiting condition will be dependent only on the actuation force of the actuation means 19A and the urging force of the urging means 18A, whereupon, by appropriately setting that urging force of the urging means 18A, a differential motion condition will definitely be obtained during low-speed turning, and a differential motion limiting condition will definitely be obtained when turning at high speed or under heavy loading.

Furthermore, because a pressure ring 12, side gear 15, and collars 29 are used, as in the differential gears 10, it is possible to configure the pressure ring 12 with thinner material thickness in the direction of the wheel axles compared to conventional differential gears, and to increase the number of clutch plates 31 and 32 by that measure.

Third Differential Gears

These third differential gears are an application of the present invention to differential gears for a horizontally mounted engine.

Figure 8:
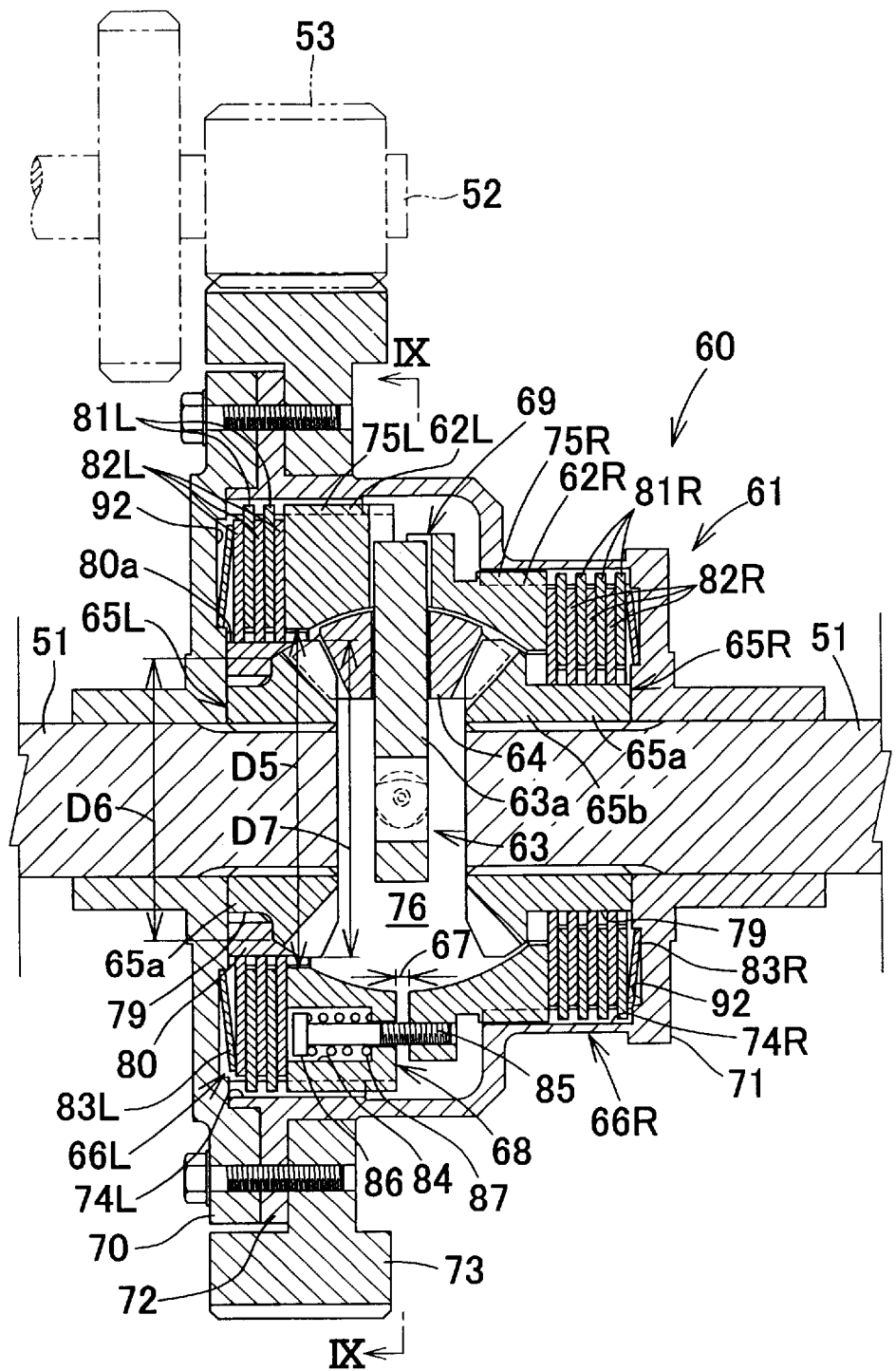
FIG. 8 is a horizontal section of differential gears (section at VIII—VIII line in FIG. 9)
Figure 9:
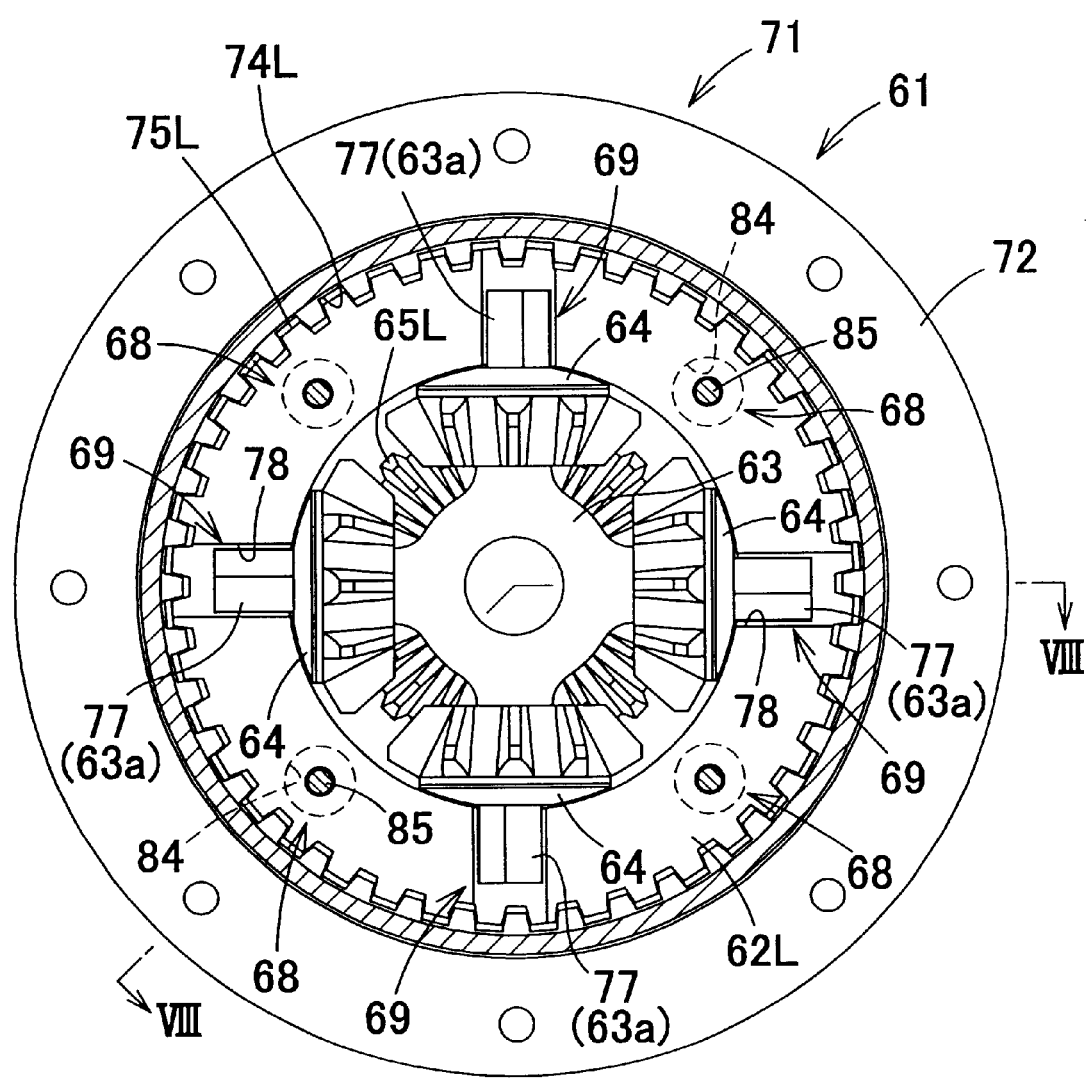
FIG. 9 is a section at the IX—IX line in FIG. 8.
Figure 10:
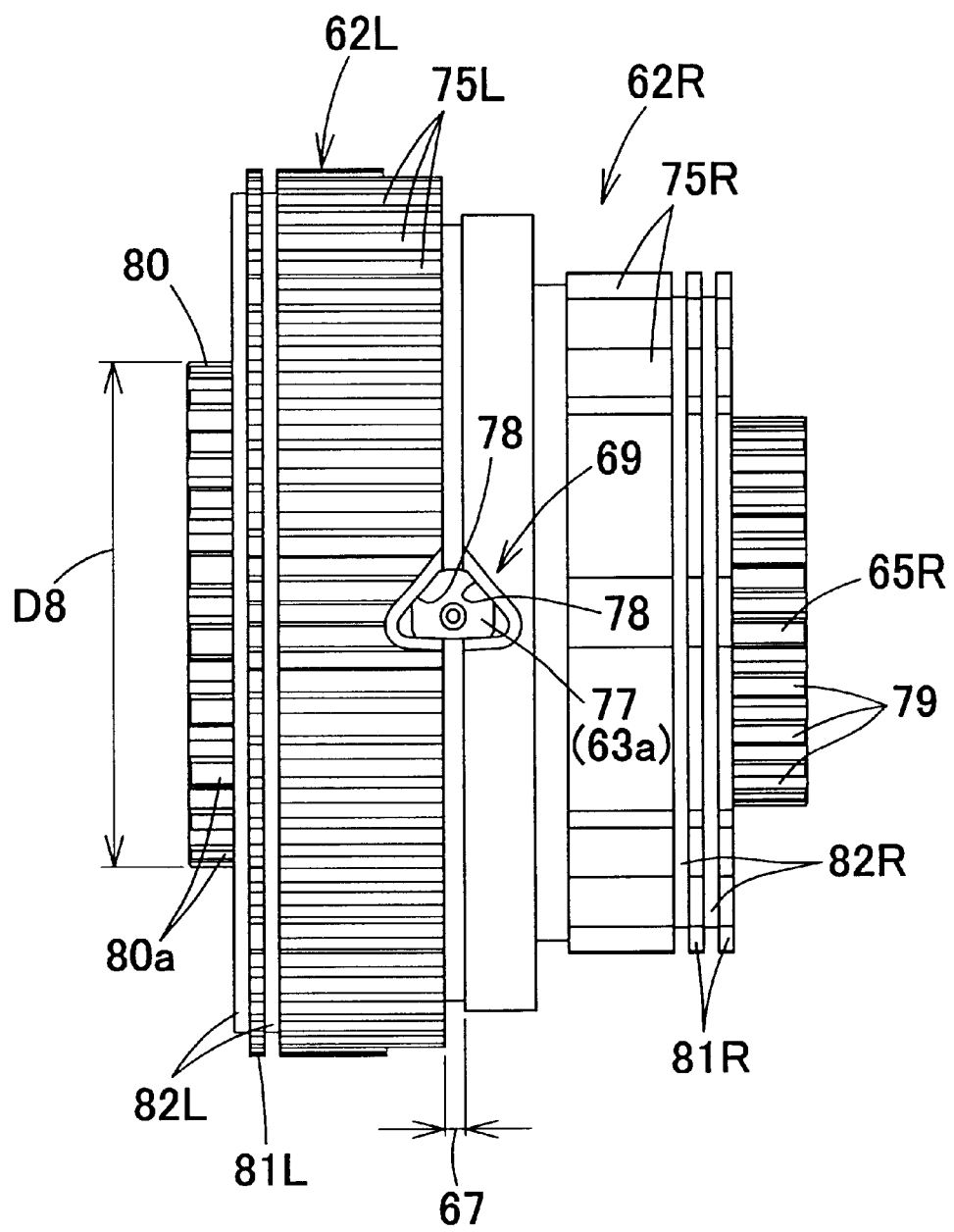
FIG. 10 is a front elevation of pressure rings and members assembled therewith.
Figure 11:
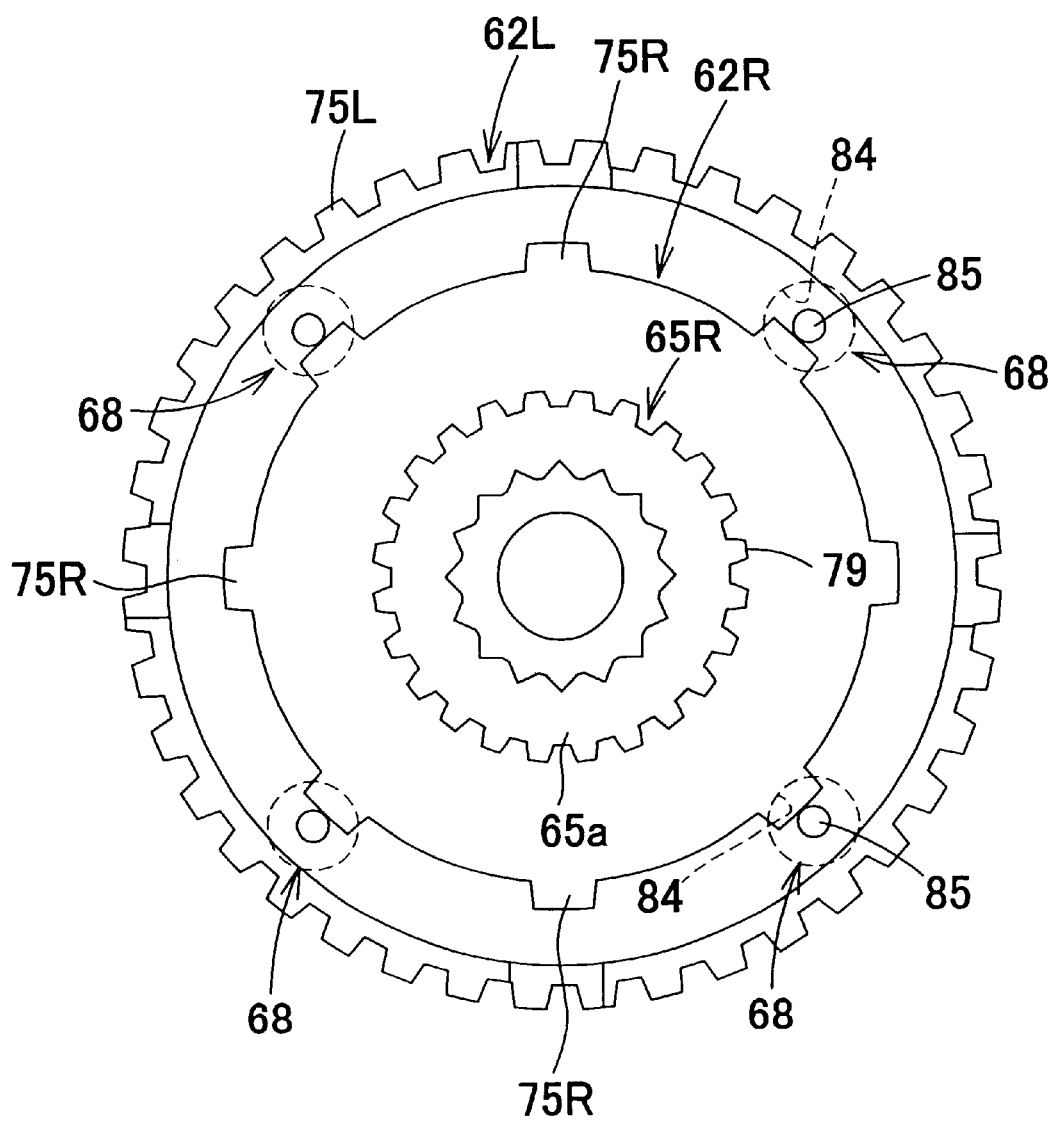
FIG. 11 is a side elevation of pressure rings and members assembled therewith.
Figure 12:
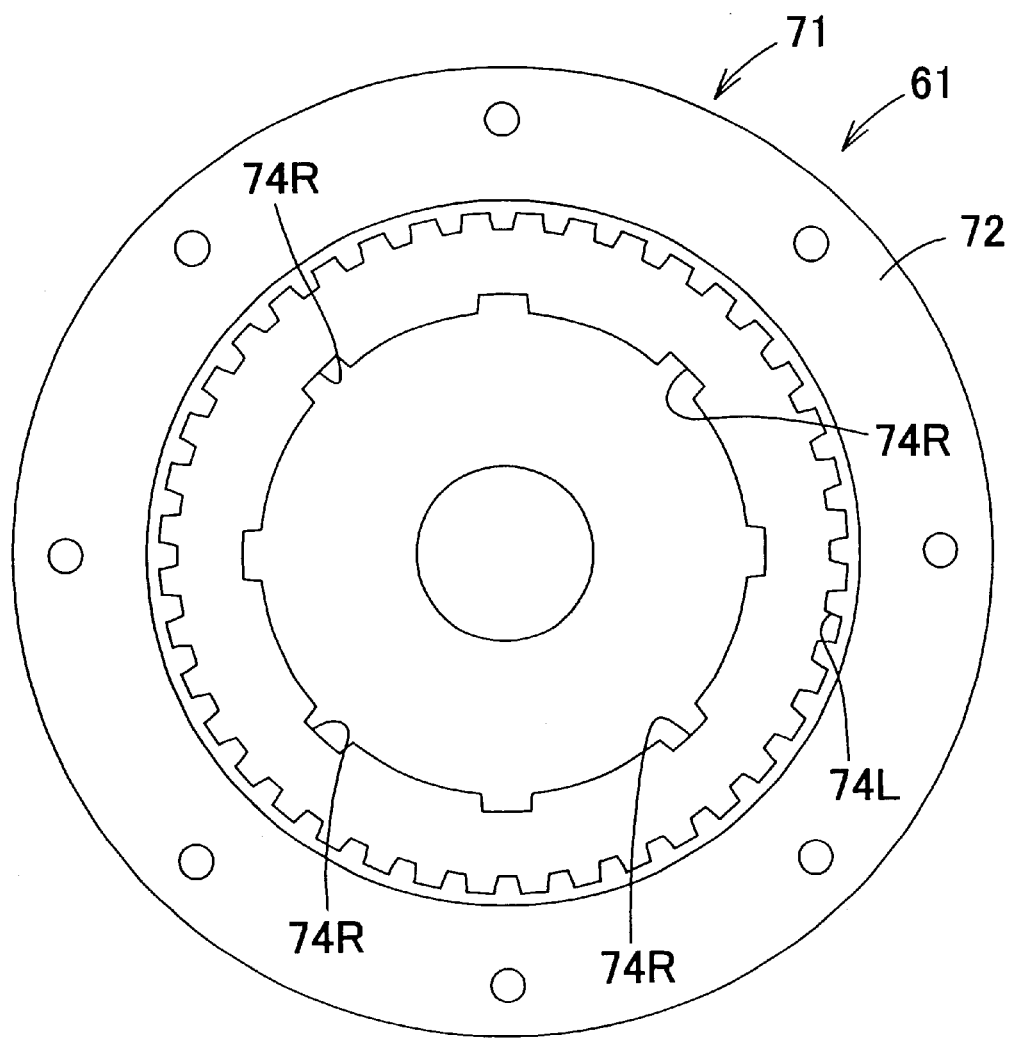
FIG. 12 is a side elevation of a differential case.

As diagrammed in FIG. 8 and FIG. 9, these differential gears 60 comprise a differential case 61 that is turned by the drive force from the engine about a turning center of the left and right wheel axles 51; a pair of left and right pressure rings 62L and 62R, deployed inside the differential case 61 so as to freely move in the direction of the wheel axles but be incapable of relative turning; a pinion shaft 63 deployed perpendicularly to the wheel axles 51 in a condition wherein the shaft ends thereof are caused to be held between the two pressure rings 62L and 62R; at least one pair of pinion gears 64 deployed so as to turn freely on the pinion shaft 63; a pair of left and right side gears 65L and 65R, deployed, respectively, so as to be incapable of relative turning, at the axle ends of the left and right wheel axles 51, which sandwich the pinion gears 64 and mesh with the pinion gears 64 on both sides thereof; a set of left and right clutch means 66L and 66R, deployed on both sides of the two pressure rings 62L and 62R in the direction of the wheel axles, being a set of left and right clutch means 66L and 66R capable of limiting the differential motion of the left and right wheel axles 51 by limiting the relative turning between the differential case 61 and the side gears 65L and 65R, having a difference imparted in the outer diameters of and/or the number of sets of clutch plates 81L and 82L, and the clutch plates 81R and 82R, between the two sets of clutch means 66L and 66R; urging means 68 for urging the two pressure rings 12 in a direction such that the clearance 67 between the two pressure rings 62L and 62R narrows; and actuation means 69 for actuating the pressure rings 12 against the urging force of the urging means 68, in a direction such that the clearance 67 between the two pressure rings 62L and 62R increases, in response to increases in the relative turning torque between the pinion shaft 63 and the differential case 61 during differential motion, and activating the clutch means 66L and 66R.

The configuration of the differential case 61 is divided between a cover member 70 and a main case body 71. The cover member 70 is secured to a flange 72 formed in the left end of the main case body 71. To the flange 72, on the side opposite from the cover member 70, is secured a ring gear 73. This ring gear 73 is meshed with a drive pinion 53 provided in a drive shaft 52 extending from the engine. In the differential case 61, the axle ends of left and right wheel axles 51 are inserted and passed through the cover member 70 and the right wall of the main case body 71 so as to be concentric. The differential case 61 is configured so as to be driven to turn, about the turning center of the wheel axles 51, by the driving force from the engine, via the drive pinion 53 and the ring gear 73.

As diagrammed in FIGS. 8 to 12, the left portion of the main case body 71 is configured so as to have an inner diameter that is larger than the inner diameter of the right portion thereof. In the left portion of the inner circumferential surface of the main case body 71 are formed spline channels 74L, in a plural number, extending in the direction of the wheel axles, at a pitch of one every 9°, for example, in the circumferential direction, while in the right portion thereof are formed spline channels 74R, in a plural number, extending in the direction of the wheel axles, at a pitch of one every 45°, for example, in the circumferential direction. The pitch of both the left and right spline channels 74L and 74R can be set to any pitch. It is also possible to match the pitch of both the left and right spline channels 74L and 74R, but it is not very easy to machine spline channels toward the back part of the main case body 71, wherefore the pitch of the spline channels 74R is set larger than the pitch of the spline channels 74L in a configuration that allows the machining work on the main case body 71 to be reduced.

Inside the main case body 71, a set of left and right ring-shaped pressure rings 62L and 62R is deployed which have partially spherical inner surface sides set in opposition. In the outer circumferential surface of the pressure ring 62L on the left side are formed spline teeth 75L that engage spline channels 74L, while in the outer circumferential surface of the pressure ring 62R on the right side are formed spline teeth 75R that engage spline channels 74R. The two pressure rings 12 are deployed inside the main case body 71 so that, by the engagement between the spline teeth 75L and 75R and the spline channels 74L and 74R, they move freely in the direction of the wheel axles but are incapable of relative turning. The size and shape of the differential case 61 can be set to any size and shape, according to the vehicle employed in. The spline channels 74L and 74R, and the spline teeth 75L and 75R, moreover, can be formed having any cross-sectional shape, and the number thereof can be set to any number, so long as the configuration thereof can guide the pressure rings 62L and 62R so as to move freely in the direction of the wheel axles but be incapable of relative turning with respect to the differential case 61.

Inside a gear chamber 76 formed between the two pressure rings 62L and 62R is deployed a substantially cross-shaped pinion shaft 63. In the pinion shaft 63 are formed four shafts 63a which extend in directions perpendicular to the wheel axles 51. The pinion gears 64 are supported so that they turn freely by the shafts 63a. The number of the pinion gears 64 can be set to any number, but at least 1 pair is to be provided.

Cams 77 are formed on the shaft ends of the pinion shaft 63, and cam channels 78 made to correspond with the cams 77 are respectively formed in the opposing surface side portions of the outer walls of the two pressure rings 12. The pinion shaft 63 is supported inside the gear chamber 76 by the cams 77 of the shafts 63a being held sandwiched between the cam channels 78 of the two pressure rings 12. The actuation means 69 are also configured by the cams 77 and the cam channels 78, a description whereof is given further below.

Inside the gear chamber 76 are deployed one pair of left and right side gears 65L and 65R which sandwich the pinion gears 64 and mesh with the pinion gears 64 on either side thereof. The left and right wheel axles 51 pass through the pressure rings 62L and 62R and protrude respectively into the gear chamber 76. The left and right side gears 65L and 65R are connected respectively to the shaft ends of the left and right wheel axles 51 by spline fitting or the like so that they are incapable of relative turning. In the two side gears 65L and 65R, sleeves 65a which extend along the wheel axles 51 from the pressure rings 62L and 62R toward the outside are integrally formed. In the sleeves 65a of the left and right side gears 65L and 65R are formed spline teeth 79, across substantially the entire length thereof. On the sleeves 65a of the side gears 65L on the left side, collars 80 are spline-fit, so as to be incapable of relative turning. In the outer circumference of the collars 80, across the entire length thereof, are formed spline teeth 80a which extend in the direction of the wheel axles. The sleeves 65a and the collars 80 of the side gears 65L on the left side, furthermore, so long as they are incapable of relative turning, may be joined by keys and key channels or ridge channels and projecting ridges or the like instead of spline fitting, or they may be joined by welding or the like.

On both sides of the two pressure rings 62L and 62R, in the direction of the wheel axles, clutch means 66L are mounted externally through the collars 80 to the sleeves 65a of the side gears 65L on the left side, and clutch means 66R are mounted externally directly to the sleeves 65a of the side gears 65R on the right side.

The clutch means 66L on the left side have first clutch plates 81L and second clutch plates 82L deployed so as to alternate, with the first clutch plates 81L fitted into the differential case 61 so that, by the spline channels 74L in the differential case 61, they move freely in the direction of the wheel axles but are incapable of relative turning, and the second clutch plates 82L are fitted over the sleeves 65a of the side gears 65L on the left side, via the collars 80, so that they move freely in the direction of the wheel axles but are incapable of relative turning.

The clutch means 66R on the right side have first clutch plates 81R and second clutch plates 82R deployed so as to alternate, with the first clutch plates 81R fitted into the differential case 61 so that, by the spline channels 74R in the differential case 61, they move freely in the direction of the wheel axles but are incapable of relative turning, and the second clutch plates 82R are fitted over the side gears 65R on the right side so that they move freely in the direction of the wheel axles but are incapable of relative turning.

Then, when the two sets of clutch means 66L and 66R are actuated by the actuation means 69, the clutch plates 81L and 82L will press against each other, and the clutch plates 81R and 81R will press against each other, friction will develop between the clutch plates, and, in response thereto, the relative turning between the differential case 61 and the side gears 65L and 65R will be limited.

Here, the characteristic configuration of the invention is seen in that the clutch plates 81L and 82L, on the one hand, and the clutch plates 81R and 82R, on the other, are made to differ in terms of numbers of sets and/or outer diameter, the clutch plates are deployed in the differential case 61 without wasting space, the area of the friction pressing portion of the clutch plates is set as large as possible, and adequate differential motion limiting action is obtained even under heavy loading.

More specifically, as diagrammed in FIG. 8, The outer diameters of the clutch plates 81R and 82R are configured smaller than those of the clutch plates 81L and 82L, and the number of the clutch plates 81R and 82R is set more numerous than the number of the clutch plates 81L and 82L. However, it is possible to set the diameters and numbers of the clutch plates to any values, according to the shape of the differential case 61, and differential gears wherein a difference is imparted between the left and right clutch plates 66L and 66R in terms of either diameter or number are within the category of the present invention.

The inner diameter D5 of the pressure ring 62L is set somewhat larger than the outer diameter D6 at the bases of the teeth in the gears 65b of the side gears 65L, and preferably somewhat larger than the outer diameter D7 at the tips of the teeth thereof. In order to prevent the second clutch plates 82L from coming off of the collars 80 to the side of the gears 65b, the outer diameter D8 of the collars 80 are configured somewhat larger than the outer diameter D7 of the side gears 65L at the tips of the teeth thereof, while the inner diameter D5 of the pressure ring 62L is configured somewhat larger than the outer diameter D8 of the these collars 80, and by inserting the ends of the collars 80 into the pressure ring 62L, the second clutch plates 82L are prevented from coming off.

By setting the inner diameter of the pressure ring 62L larger than the diameters of the side gears 65L and the collars 80 in this manner, it becomes possible to configure the pressure ring 62L with thinner material thickness in the direction of the wheel axles than in the prior art, to provide so that the outer end surfaces of the pressure ring 62L in the direction of the wheel axles and the outer end surfaces of the gears 65b of the side gears 65L and 65R, in the direction of the wheel axles, become substantially flat, and to deploy the clutch plates 81L and 82L of the clutch means 66L so that they approach as close as possible to the gears 65b. By that measure, the number of clutch plates 81L and 82L built into the assembly is increased, the friction pressure portion of the clutch plates 81L and 82L is increased, and adequate differential motion limiting action is obtained even when under heavy loading.

In this embodiment, furthermore, the collars 80 are provided only in the side gears 65L on the left side, but it is possible to provide collars for the side gears 65R on the right side also and make the configuration there the same as on the left side. The configuration is made such that the side gears 65L and the collars 80 are divided, moreover, but it is also possible to implement a unified configuration. However, splines will in that case be formed in the outer circumferences of the sleeves 65a in order to support the second clutch plates 82L so that they move freely in the axial direction relative to the sleeves 65a, but, it being very difficult to form splines in the sleeves 65a in the vicinity of the gears 65b, the number of clutch plates 81L and 82L that can be assembled therein is diminished by that measure, wherefore the spline pitch should be set the same as the pitch of the teeth of the side gears 65L, and spline teeth which extend continuously from the teeth of the side gears 65L toward the outside in the axial direction should be formed.

Channels 92 are formed in the right wall of the main case body 71 and in the cover member 70, and, in the channels 92 on the left side of the left-side clutch means 66L, plate springs 83L are provided which urge the clutch plates 81L and 82L toward the pressure ring 62L side, while in the channels 92 on the right side of the right-side clutch means 66R, plate springs 83R are provided which urge the clutch plates 81R and 82R toward the pressure ring 62R side. These plate springs 83L and 83R are deployed with the object of eliminating play between the clutch plates 81L and 82L and the clutch plates 81R and 82R, respectively, and are set at a level of urging force such that almost no frictional forces act between the clutch plates. However, when it is possible to assemble the clutch means 66L and 66R so that play is more or less eliminated, the plate springs 83L and 83R may be omitted. In this embodiment, moreover, in order to increase the number of the clutch plates as much as possible, the plate springs 83 are accommodated in the channels 92, but it is also possible to provide the plate springs 83 without forming the channels 92.

Between the two pressure rings 62L and 62R, urging means 68 are deployed which urge those rings in a direction wherewith they will approach each other. More specifically, in the pressure ring 62L, accommodation holes 84 are formed, between the shaft ends of the shafts 63a adjacent to the pinion shaft 63, and into these accommodation holes 84 are loaded rod members 85 which pass through the pressure ring 62L and are screwed into the pressure ring 62R. The rod members 85 are established in a length whereat they will not protrude outside the pressure ring 62L even when the two pressure rings 62L and 62R are the closest together, that is, even when the clearance 67 between the two pressure rings 62L and 62R has reached the minimum, and flanges 86 are formed on the ends of the rod members 85. To the rod members 85, in inside the accommodation holes 84, are externally mounted elastic members 87 which comprise compressed coil springs. The two pressure rings 62L and 62R are always urged by the urging force of the elastic members 87 so as to mutually approach each other via the rod members 85.

It is possible, furthermore, to make the urging means 68 of any configuration, and deploy them in any number in any position in the two pressure rings 62L and 62R, so long as they are configured so that it is possible thereby to urge the two pressure rings 62L and 62R in a direction such that they mutually approach each other, without the intervention of the clutch means 66L and 66R. Instead of the elastic members 87 which comprise compressed coil springs, moreover, elastic members comprising plate springs or synthetic rubber or the like may be used, or pulling springs or the like may be used to pull the two pressure rings 62L and 62R in a direction such that they approach each other. It is also possible to deploy urging means between the differential case 61 and the pressure rings 62L and 62R.

Alternatively, when the urging means 68 is deployed between those shaft ends that are adjacent to the pinion shaft 63 of the pressure rings 62L and 62R, as described in the foregoing, it is possible to cause the urging means to be deployed inside the dead space between the shaft ends, the pressure rings 62L and 62R and the differential case 61 can be configured in a small size in the radial dimension, and the shaft ends of the pinion shaft 63 can be extended out to the vicinity of the inner surface of the differential case 61, and the contact area between the cams 77 and cam channels 78 of the actuation means 69 described next increased. Therefore, wear and damage in the two members resulting from the relative turning torque acting between the cams 77 and the cam channels 78 can be effectively prevented, and the durability of the differential gears enhanced. However, it is also possible to position the rod members 85 of the urging means 68 further to the outside than the shaft ends of the pinion shaft 63 of the pressure rings 62L and 62R. Providing such urging means 68 as these is to be preferred, moreover, but it is also possible to apply the present invention similarly to differential gears configured such that the urging means 68 are omitted, and the left and right pressure rings 62L and 62R are urged in a direction such that they will approach each other by the plate springs 83L and 83R.

Figure 13:
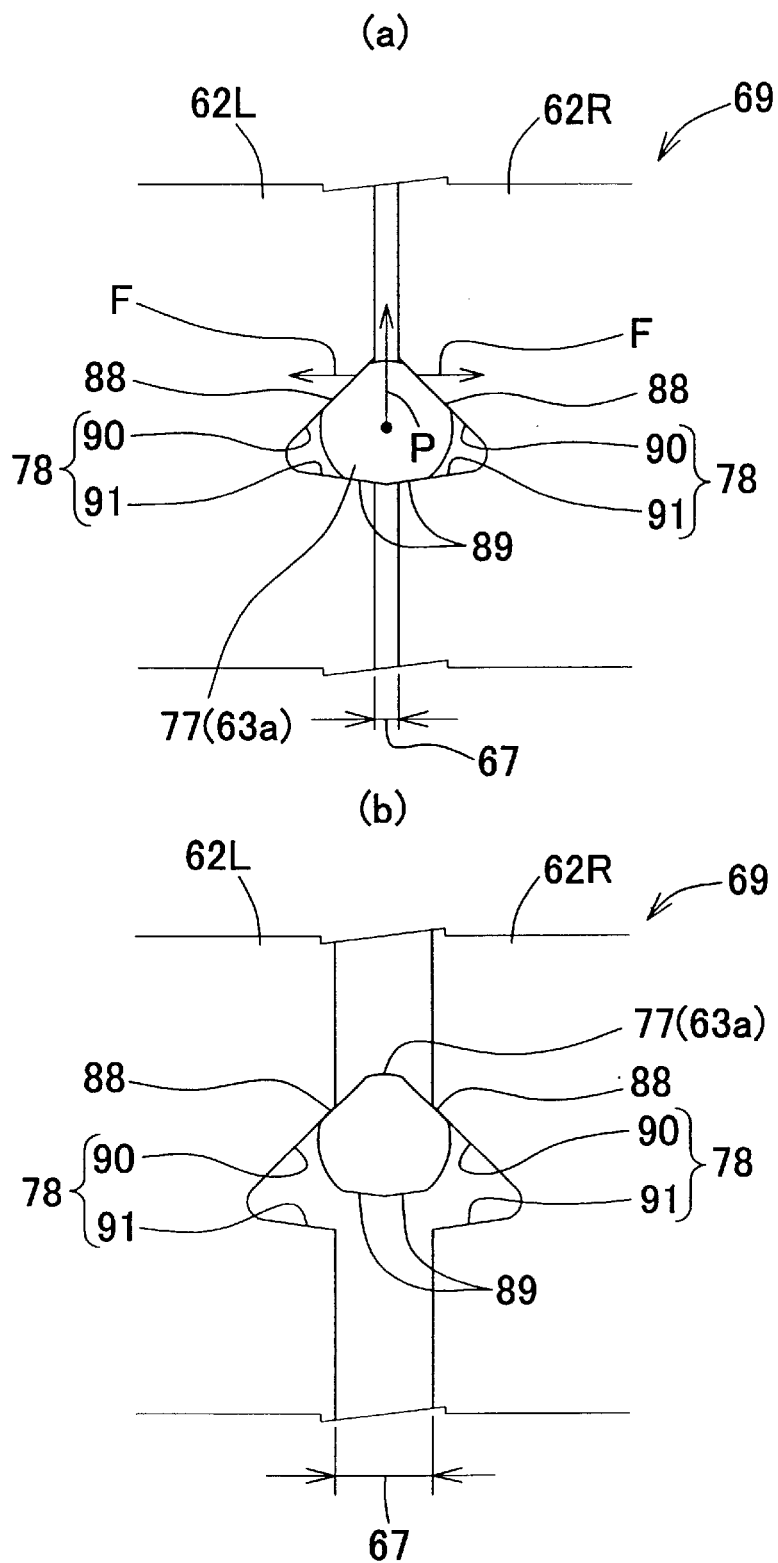
FIG. 13 is a diagram for explaining the action of actuation means.
Figure 14:
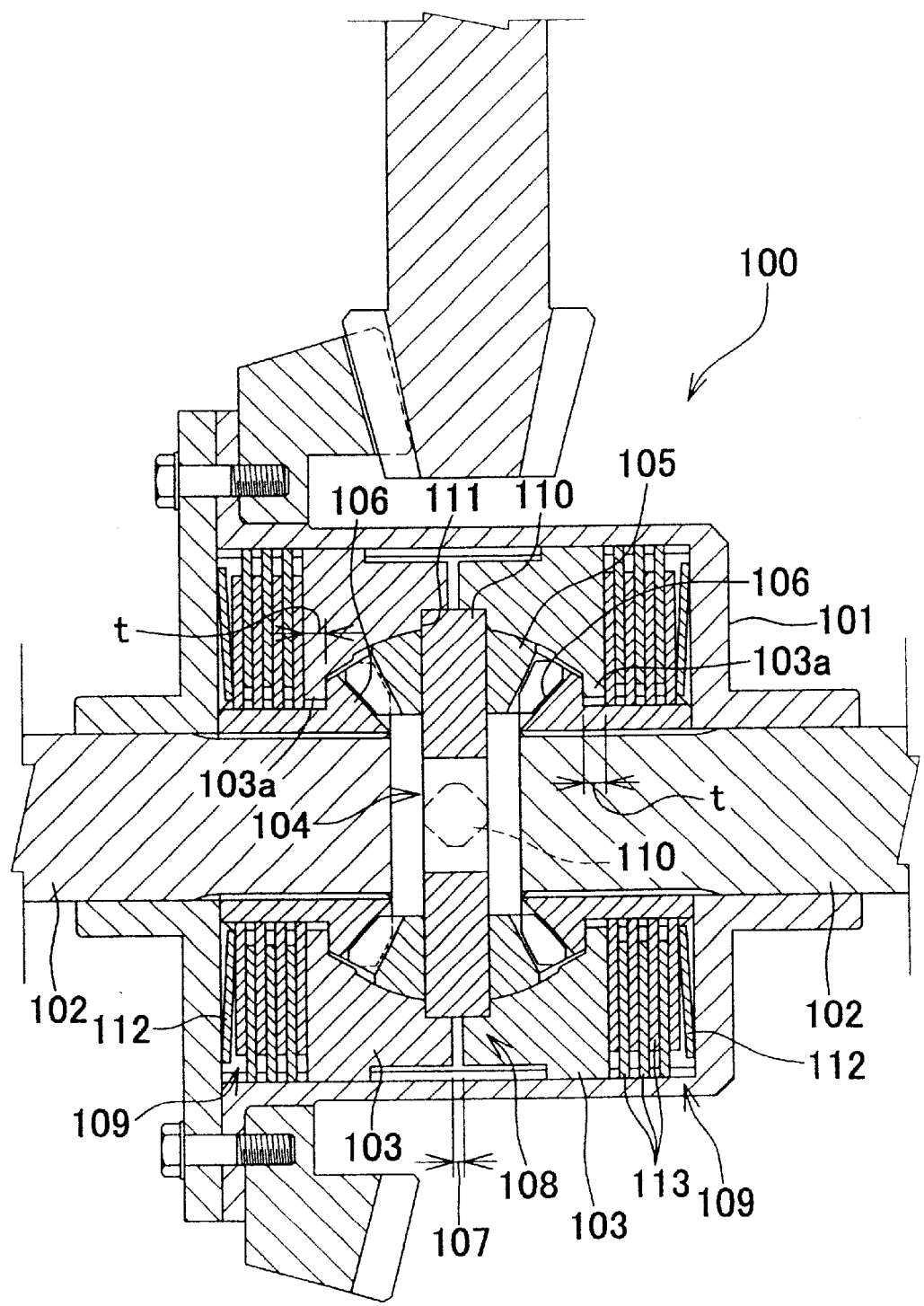
FIG. 14 is a horizontal section of differential gears relating to the prior art.
Figure 15:
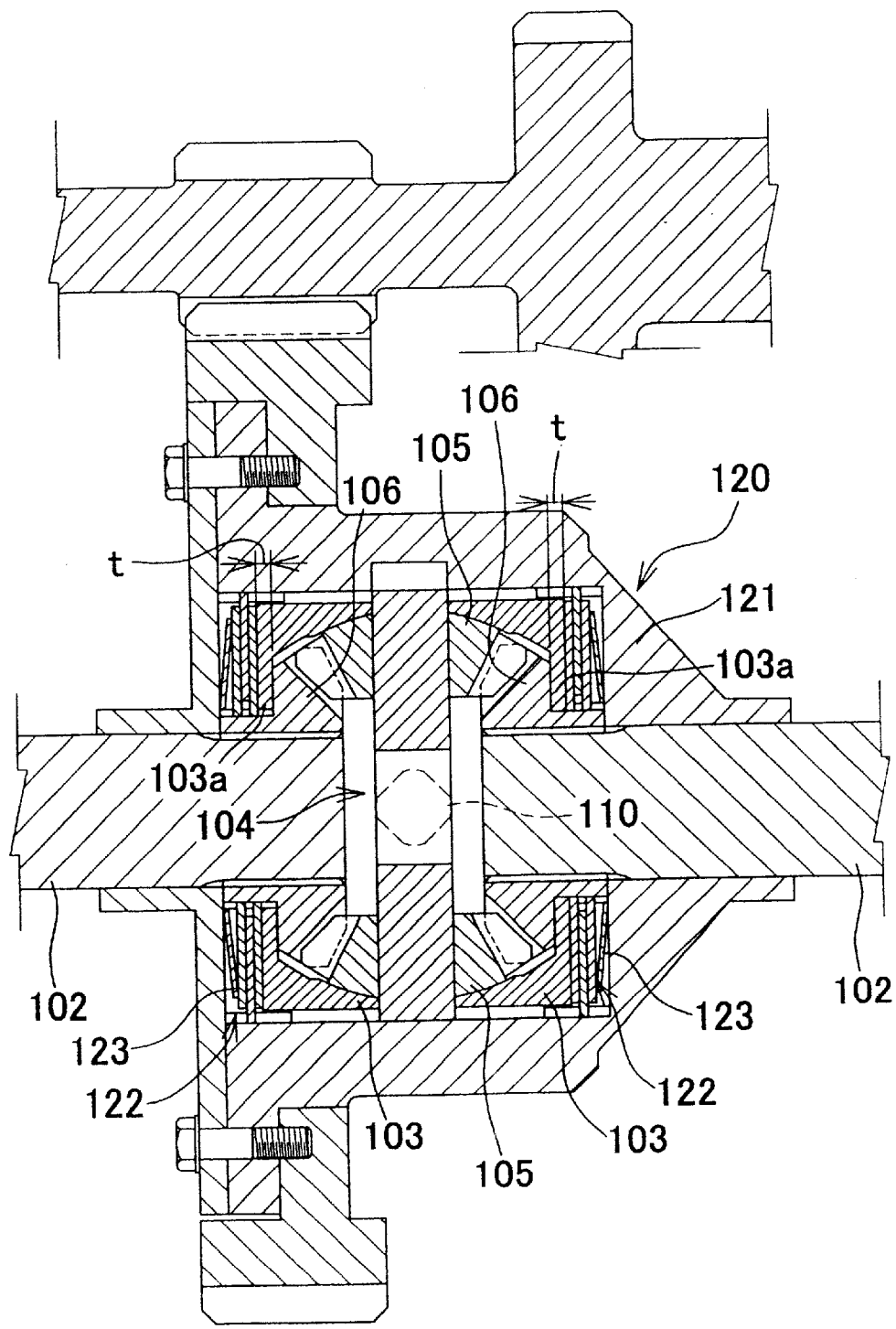
FIG. 15 is a horizontal section of differential gears of another configuration relating to the prior art.
Figure 16:
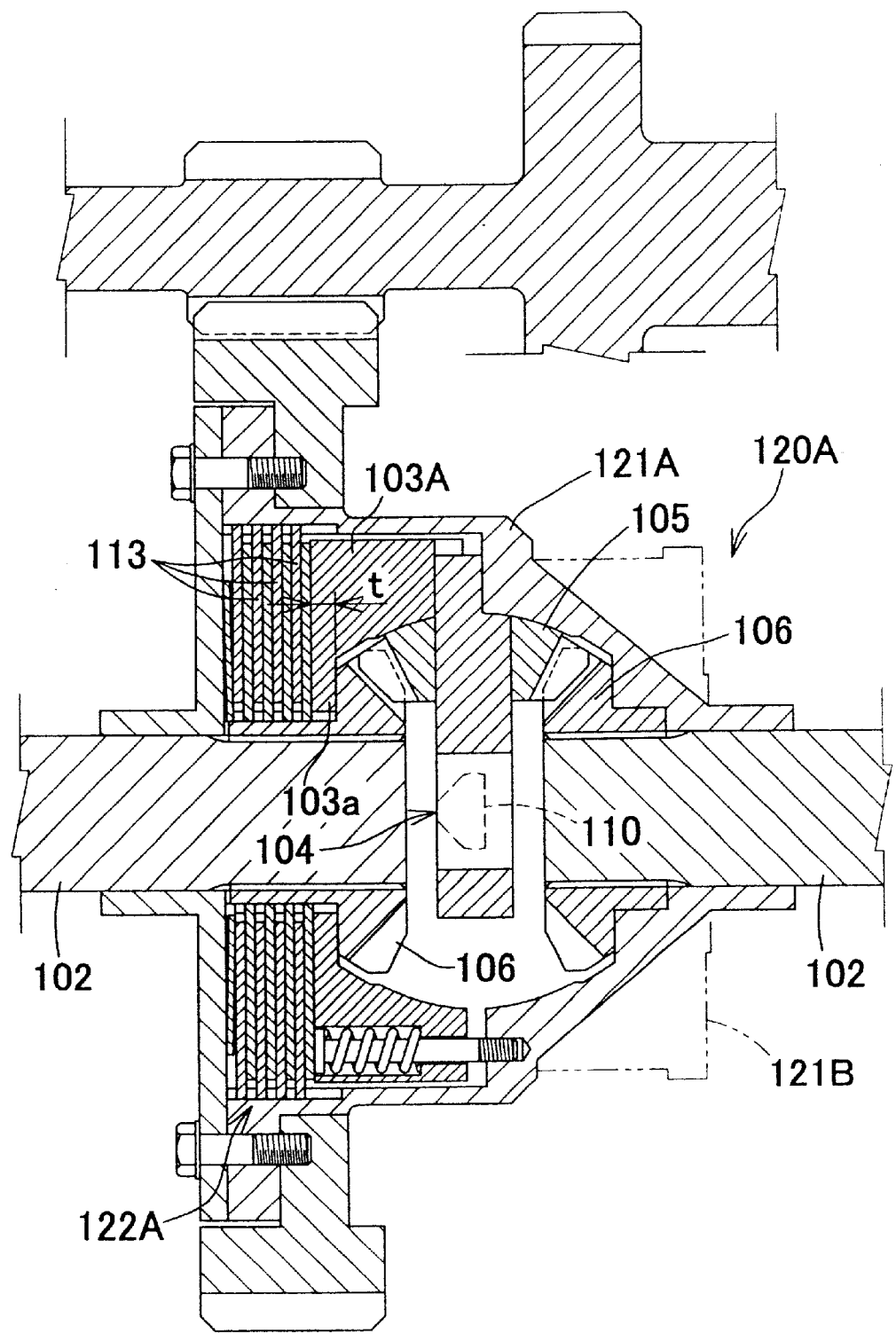
FIG. 16 is a horizontal section of the differential gears for which an application was previously filed.

The actuation means 69, which are configured in the same way as the actuation means 19 in the first differential gears 10 described earlier, as diagrammed in FIG. 10 and FIG. 13, are configured with cams 77 deployed on the shaft ends of the four shafts 63a of the pinion shaft 63, and cam channels 78 formed respectively in the opposing portions of the two pressure rings 62L and 62R. The cams 77 comprise a pair of actuation surfaces 88 formed in a substantially inverted V shape that are mirror symmetrical to surfaces perpendicular to the wheel axles containing the centers of the shafts 63a, and abutting surfaces 89 which extend substantially in the direction of the wheel axles, formed so as to sandwich therebetween the centers of the shafts 63a, on the side opposite from the actuation surfaces 88. The cam channels 78 are formed in substantially right triangular shape with sloping cam surfaces 90 of a shape matching the actuation surfaces 88, and latching surfaces 91 of a shape matching the abutting surfaces 89.

Then, when, from the condition diagrammed in FIG. 13(a), the pinion shaft 63 exhibits minute relative turning in the direction indicated by the arrow P, relative to the pressure rings 62L and 62R, as diagrammed in FIG. 13(b), the two pressure rings 62L and 62R move in a direction such that they mutually separate via the actuation surfaces 88 and the sloping cam surfaces 90, but, when they try to exhibit minute relative turning in the direction opposite that indicated by the arrow P, the abutting surfaces 89 are latched by the latching surfaces 91, and the relative turning between the two pressure rings 62L and 62R, on the one hand, and the pinion shaft 63, on the other, is restricted. For the actuation means 69, however, means of any configuration can be adopted so long as they are capable of actuating the two pressure rings 62L and 62R in a direction such that they will mutually separate, by relative turning torque between the pinion shaft 63 and the differential case 61. As indicated as an example under "Description of the Related Art," means may be adopted wherewith, for the cams 77, cams 77 having a substantially square or diamond shape are formed wherein one diagonal is oriented substantially in the direction of the wheel axles, and, for the cam channels 78, substantially V-shaped cam channels that match the cams are formed.

Next, the action of the differential gears 60 is described.

In the differential gears 60, when the turning resistance on the left and right wheels is the same, the pinion gears 64, side gears 65L and 65R, pinion shaft 63, and pressure rings 62L and 62R all turn integrally with the differential case 61, and the left and right wheels turn at the same speed.

During forward travel, when the turning resistance on the wheel on one side becomes less, basically, a differential motion condition will ensue wherein the pinion gears 64 will revolve while meshing with the side gears 65L and 65R, driven by part of the turning force acting on the differential case 61, and the turning speed of the wheel on the side of lesser turning resistance will become faster than that of the wheel on the side of larger turning resistance. However, at high speed or under heavy loading, a differential motion limiting condition ensues wherein the relative turning of the side gears 65L and 65R and the differential case 61 is limited by the friction pressure force between the clutch plates 81L and 82L, and between the clutch plates 81R and 82R, of the clutch means 66L and 66R, respectively, whereupon, while enhancing cornering ability at low speed, adequate controllability at high speed or under heavy loading can be secured.

More specifically, when a difference in turning resistance between the left and right wheels occurs during forward travel, then, as diagrammed in FIG. 13(a), a relative turning torque P develops in the direction indicated by the arrow P between the pinion shaft 63 and the differential case 61 due to the actuation means 69, and, due to that relative turning torque P, an actuation force F will act, via the actuation surfaces 88 of the cams 77 and the sloping cam surfaces 90 of the cam channels 78, on the two pressure rings 62L and 62R in the direction indicated by the arrow F wherewith the two pressure rings 62L and 62R will mutually separate. Thereupon, as diagrammed in FIG. 13(b), the pinion shaft 63 and the differential case 61 will try to effect minute turning, relatively, and the clearance 67 will try to increase due to the fact of the contact positions between the actuation surfaces 88 of the cams 77 and the sloping cam surfaces 90 of the cam channels 78 being displaced.

Meanwhile, due to the urging means 68, an urging force will always be acting on the pressure rings 62L and 62R seeking to make them approach each other, wherefore, when the actuation force F of the actuation means 69 is smaller than the urging force of the urging means 68, then, as diagrammed in FIG. 13(a), a minimum clearance 67 is maintained and a differential motion condition ensues. When the actuation force F becomes larger than the urging force, then, as diagrammed in FIG. 13(b), the clearance 67 becomes larger, according to the difference in force, the clutch plates 81L and 82L, and the clutch plates 81R and 82R, respectively, are pressed by the side surfaces of the two pressure rings 62L and 62R, and the clutch plates are friction pressed together, whereby the differential motion limiting condition ensues.

In the differential gears 60, moreover, because the two pressure rings 62L and 62R are urged by the urging means 68 in a direction wherewith they approach each other, without the intervention of the clutch means 66L and 66R, it is possible to make the configuration such that the timing of the switching from the differential motion condition to the differential motion limiting condition will be dependent only on the actuation force F of the actuation means 69 and the urging force of the urging means 68, whereupon, by appropriately setting that urging force of the urging means 68, a differential motion condition will definitely be obtained during low-speed turning, and a differential motion limiting condition will definitely be obtained when turning at high speed or under heavy loading.

When the turning resistance on the wheel on one side becomes less during reverse travel, on the other hand, even should a relative turning torque develop between the pinion shaft 63 and the differential case 61, that relative turning torque will be arrested by the abutting surfaces 89 of the cams 77 being latched by the latching surfaces 91 of the cam channels 78, and the minute relative turning between the two will be restricted, wherefore a condition will ensue wherein minimum clearance 67 is maintained, and a differential motion limiting condition will ensue. However, it is also possible to make the configuration so that, even during reverse travel, in like manner as during forward travel, a differential motion condition and differential motion limiting condition will be switched between. When that is the case, for the actuation means 69, for example, means will be adopted wherewith the cams are formed in diamond or square shapes, as noted earlier, and the cam channels are formed substantially in V shapes which match the cams.

Based on the first differential gears relating to the present invention, although the action thereof is basically the same as in conventional differential gears having a differential motion limiting function, because of the simple configuration of setting the inner diameter of the pressure rings larger than the diameter of the side gears, the material thickness of those pressure rings in the wheel axle dimension can be made thinner than in conventional differential gears, by which measure the number of clutch plates can then be increased, whereupon it becomes possible to increase the friction pressing portion of the clutch plates, and to obtain adequate differential motion limiting action even under heavy loading.

Based on the second differential gears relating to the present invention, the same kind of benefits are obtained as with the first differential gears. In addition, however, based on the second differential gears, only one set of clutch means need be built in, wherefore assembling the differential gears is made easier, and it is also possible to build in clutch means on the side of the differential case having room to spare, whereupon, while configuring the differential gears in a small size, it is possible to set the size of the clutch plates as large as possible and raise the friction pressure force. Accordingly, these differential gears are well suited to applications in horizontally mounted engines where the restrictions on the shape and/or size of the differential case are severe.

Based on the third differential gears relating to the present invention, although the action thereof is basically the same as in conventional differential gears having a differential motion limiting function, because differences are imparted between the two sets of clutch means in terms of the number of sets and/or outer diameter of the clutch plates, it is possible therewith to adjust the number of sets and/or the size of the clutch plates according to the shape of the differential case, and to build in the clutch plates without any gap, whereupon the area of the friction pressing portion of the clutch plates will be increased to the extent possible, and adequate differential motion limiting action will be obtained even under heavy loading.

Here, when, in addition to imparting a difference in the diameters of the clutch plates in the left and right clutch means of the third differential gears, the pitch of splines in the small-diameter clutch plates is set larger than the pitch of splines in the large-diameter clutch plates, the purpose of those splines being to fit the clutch plates in the differential case so that they move freely in the axial direction but are incapable of relative turning, it is possible to reduce the work involved in machining splines for the differential case.

In the third differential gears, when the inner diameter of at least one of the pressure rings is set larger than the diameter of the side gears, it becomes possible to configure the pressure ring(s) with a thinner material thickness in the axial dimension, and, by that measure, to increase the number of clutch plates that it is possible to accommodate, making it possible to increase the friction pressing portion of the clutch plates and to enhance the differential motion limiting action.

In the first, second, and third differential gears, when collars that fit over the sleeves in the side gears so as to be incapable of relative turning are provided, and second clutch plates are mounted by being fit over those collars so that they freely move in the axial direction but are incapable of relative turning, it becomes possible to form splines all the way to the gears of the side gears, and the number of clutch plates that can be built in is increased to the degree possible, wherefore these differential gears are to be preferred.

When the collars are configured to have substantially the same diameter as the side gears but smaller diameter than the inner diameter of the pressure rings, and one end of the collars is inserted into the pressure rings, the second clutch plates can be definitely prevented from coming off of the collars on the side toward the gears of the side gears.

In the first, second, and third differential gears, furthermore, when, for the urging means, urging means that urge the pressure rings in a direction wherewith the clearance therebetween narrows, without the intervention of clutch means, are provided, the timing of the switching from the differential motion condition to the differential motion limiting condition becomes dependent only on the actuation force of the actuation means and the urging force of the urging means. It is therefore possible to make the configuration such that, by appropriately setting the urging force of the urging means, a differential motion condition is definitely obtained during low-speed turning, while a differential motion limiting condition is definitely obtained when turning at high speed or under heavy loading.

What is claimed is:

1. Differential gears comprising:

a differential case that is turned by drive force from an engine about left and right wheel axles;

a pair of left and right side gears deployed, respectively, at the ends of said left and right wheel axles, so as to be incapable of relative turning, the side gears each comprising a respective sleeve and a respective gear portion;

collars fitted over the sleeves in the left and right side gears so as to be incapable of relative turning, said collars having a larger diameter than a maximum diameter of the side gears, and end portions of said collars being arranged along the gear portion of the side gears;

a pair of left and right pressure rings having an inner diameter larger than the collars, deployed inside said differential case so as to freely move in the direction of the wheel axles but be incapable of relative turning, and so as to cover the end portions of the collars and outer circumferential sides of the gear portion of said left and right side gears, respectively;

a pinion shaft deployed perpendicularly to the wheel axles with the ends thereof being held between said left and right pressure rings;

at least one pair of pinion gears that are deployed so as to turn freely on the pinion shaft, and mesh with said left and right side gears;

a set of clutch means that are deployed on both sides of said two pressure rings in the direction of the wheel axles, and comprises first clutch plates fitted into the differential case so as to move freely in the direction of the wheel axles but be incapable of relative turning, and second clutch plates fitted over the collars fitted over the sleeves in the side gears so as to move freely in the direction of the wheel axles but be incapable of relative turning, said first and second clutch plates being deployed alternately so that said clutch means are capable of limiting differential motion of the left and right wheel axles by limiting relative turning of the differential case and the side gears by friction between the first and second clutch plates;

urging means for urging said two pressure rings in a direction such that clearance between the two pressure rings narrows; and actuation means for actuating the pressure rings against urging force of the urging means, in a direction such that clearance between the two pressure rings increases, in accordance with increases in relative turning torque between the pinion shaft and the differential case during differential motion, and activating the clutch means.

2. The differential gears according to claim 1, wherein said urging means urge the pressure rings in a direction such that the clearance narrows without intervention of the clutch means.

3. Differential gears comprising:

a differential case that is turned by drive force from an engine about left and right wheel axles;

a pair of left and right side gears deployed, respectively, at the ends of said left and right wheel axles, so as to be incapable of relative turning, the side gears each comprising a respective sleeve and a respective gear portion;

collars fitted over the sleeves in one of the side gears so as to be incapable of relative turning, said collars having a larger diameter than a maximum diameter of the side gears, and end portions of said collars being arranged along the gear portions of the side gears;

a pressure ring having an inner diameter larger than the collars, deployed inside the differential case so as to freely move in the direction of the wheel axles but be incapable of relative turning, and so as to cover the end portion of one of the collars and an outer circumferential side of one of the side gears;

a pinion shaft deployed perpendicularly to the wheel axles with the ends thereof held between said pressure ring and the surface of the differential case facing the pressure ring;

at least one pair of pinion gears, deployed so as to turn freely on the pinion shaft, that mesh with said left and right side gears;

clutch means that are deployed on the side of said pressure ring opposite to said surface facing the pressure ring, and comprise first clutch plates fitted into the differential case so as to move freely in the direction of the wheel axles but be incapable of relative turning, and second clutch plates fitted over the collars fitted over the sleeves in the side gears so as to move freely in the direction of the wheel axles but be incapable of relative turning, said first and second clutch plates being deployed alternately so that said clutch means are capable of limiting differential motion of the left and right wheel axles by limiting relative turning of the differential case and the side gears by friction between the first and second clutch plates;

urging means for urging said pressure ring in a direction such that clearance between the pressure ring and the surface facing the pressure ring; and actuation means for actuating the pressure ring against urging force of the urging means, in a direction such that clearance between the pressure ring and the surface facing the pressure ring increases, in accordance with increases in relative turning torque between the pinion shaft and the differential case during differential motion, and activating the clutch means.

4. The differential gears according to claim 3, wherein said urging means urge the pressure rings in a direction such that the clearance narrows without intervention of the clutch means.

* * * * *